United States Patent
Chhabra et al.

(10) Patent No.: US 12,126,706 B2
(45) Date of Patent: Oct. 22, 2024

(54) INTEGRITY PROTECTED ACCESS CONTROL MECHANISMS

(71) Applicant: Intel Corporation, Santa Clara, CA (US)

(72) Inventors: Siddhartha Chhabra, Portland, OR (US); John Sell, Mountain View, CA (US)

(73) Assignee: Intel Corporation, Santa Clara, CA (US)

( * ) Notice: Subject to any disclaimer, the term of this patent is extended or adjusted under 35 U.S.C. 154(b) by 788 days.

(21) Appl. No.: 17/134,351

(22) Filed: Dec. 26, 2020

(65) Prior Publication Data

US 2022/0209933 A1    Jun. 30, 2022

(51) Int. Cl.
| | | |
|---|---|---|
| G06F 21/78 | (2013.01) | |
| G06F 21/60 | (2013.01) | |
| H04L 9/00 | (2022.01) | |
| H04L 9/06 | (2006.01) | |
| H04L 9/32 | (2006.01) | |

(52) U.S. Cl.
CPC ............ H04L 9/002 (2013.01); G06F 21/602 (2013.01); H04L 9/0643 (2013.01); H04L 9/3242 (2013.01)

(58) Field of Classification Search
CPC ..... H04L 9/002; H04L 9/0643; H04L 9/3242; G06F 21/602; G06F 21/50; G06F 21/52; G06F 21/70; G06F 21/78
See application file for complete search history.

(56) References Cited

U.S. PATENT DOCUMENTS

| | | | | |
|---|---|---|---|---|
| 2003/0188073 | A1* | 10/2003 | Zatorski | G06F 13/102 |
| | | | | 710/306 |
| 2009/0164738 | A1* | 6/2009 | Erfani | G06F 12/0888 |
| | | | | 711/E12.063 |
| 2017/0083724 | A1 | 3/2017 | Chhabra et al. | |
| 2017/0091119 | A1 | 3/2017 | Chhabra et al. | |
| 2017/0185344 | A1* | 6/2017 | Kirshenbaum | G06F 21/6218 |
| 2018/0046823 | A1 | 2/2018 | Durham et al. | |
| 2019/0158890 | A1* | 5/2019 | Chellappan | G06F 9/30003 |
| 2019/0319781 | A1 | 10/2019 | Chhabra et al. | |
| 2019/0324913 | A1* | 10/2019 | Chhabra | G06F 21/79 |
| 2020/0412742 | A1* | 12/2020 | Ekdahl | H04L 63/1416 |

OTHER PUBLICATIONS

European Search Report and Search Opinion, EP App. No. 21198575.9, Apr. 4, 2022, 12 pages.

* cited by examiner

*Primary Examiner* — Malcolm Cribbs
(74) *Attorney, Agent, or Firm* — NICHOLSON DE VOS WEBSTER & ELLIOTT LLP

(57) ABSTRACT

Detailed herein are embodiments which allow for integrity protected access control to provide defense against deterministic software attacks. Software attacks such as rowhammer attacks which target the TD bit itself are defended against using cryptographic integrity which the data itself is protected by the TD-bit alone. As such, software is reduced to performing only non-deterministic attacks (e.g., random corruption), but all the deterministic attacks are defended against. Additionally, integrity-protected access control bits are protected against simple hardware attacks where the adversary with physical access to the machine can flip TD bits to get ciphertext access in software which can break confidentiality.

18 Claims, 22 Drawing Sheets

| MSR BIT FIELDS 801 | MSR BIT DESCRIPTION 803 |
| --- | --- |
| 0 | AES-XTS 128-BIT ENCRYPTION |
| 1 | AES-XTS 128-BIT ENCRYPTION WITH AT LEAST 30-BIT SHA-3-BASED MAC |
| 2 | AES-XTS 256-BIT ENCRYPTION |
| 3 | AES-XTS 256-BIT ENCRYPTION WITH AT LEAST 30-BIT SHA-3-BASED MAC |
| 4 | AES-XTS 256-BIT ENCRYPTION WITH INTEGRITY PROTECTED ACCESS CONTROL |
| 31:5 | RESERVED |
| 63:32 | MKTME AND KEYID |

FIG. 8

| MSR BIT FIELDS 901 | MSR BIT DESCRIPTION 903 |
|---|---|
| 0 | LOCK RO |
| 1 | ENABLE |
| 2 | KEY SELECT (0 – CREATE NEW; 1 – RESTORE KEY) |
| 3 | SAVE KEY FOR STANDBY |
| 7:4 | POLICY/ENCRYPTION ALGORITHM |
| 31:8 | RESERVED |
| 35:32 | KEYID_BITS |
| 47:36 | RESERVED |
| 63:48 | ALG_ENABLE |

FIG. 9

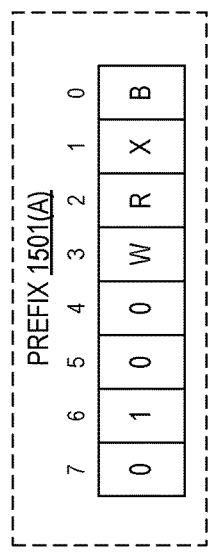
FIG. 17
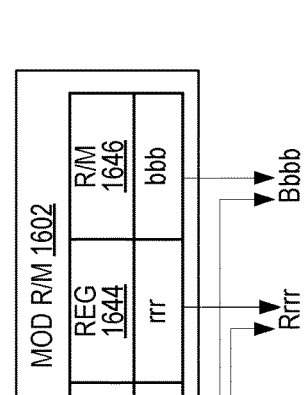
FIG. 18(D)
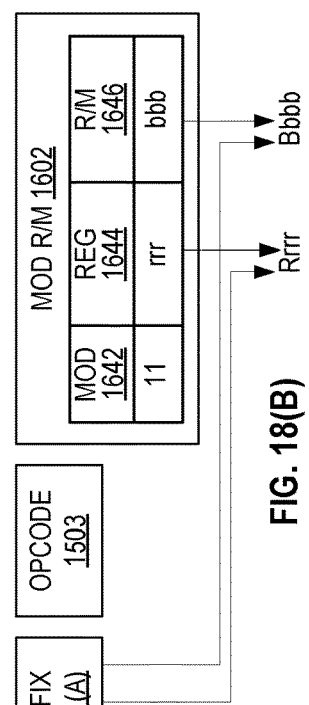
FIG. 18(B)
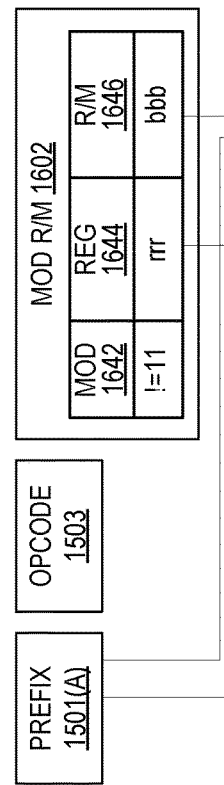
FIG. 18(A)
FIG. 18(C)

INTEGRITY PROTECTED ACCESS CONTROL MECHANISMS

BACKGROUND

Modern computing systems employ disk encryption to protect data stored at rest on hard drive disks or other data storage. Attackers, however, can use a variety of techniques including bus scanning, memory scanning, and the like, to retrieve data from memory. The memory may itself include the keys used for disk encryption, thus exposing the data encrypted on a disk drive. Even if data stored in memory is first encrypted, access to encrypted data still allows for various types of replay attacks. Various techniques, therefore, have been employed to protect sensitive data residing in at least some regions of memory. Doing so has become challenging, particularly in a cloud or server environment where multiple customer workloads (from different entities) may be supported simultaneously on the same server. Requirements to sufficiently secure data of the different entities has extended to protection against replay attacks as well.

BRIEF DESCRIPTION OF DRAWINGS

Various embodiments in accordance with the present disclosure will be described with reference to the drawings, in which:

FIG. 8 illustrates embodiments of a model specific register (MSR) detailing memory encryption capability.

FIG. 9 illustrates embodiments of a model specific register (MSR) detailing memory activation.

FIG. 17 illustrates embodiments of a first prefix.

FIGS. 18(A)-(D) illustrate embodiments of how the R, X, and -bit fields of the first prefix are used.

DETAILED DESCRIPTION

Figure 1A:
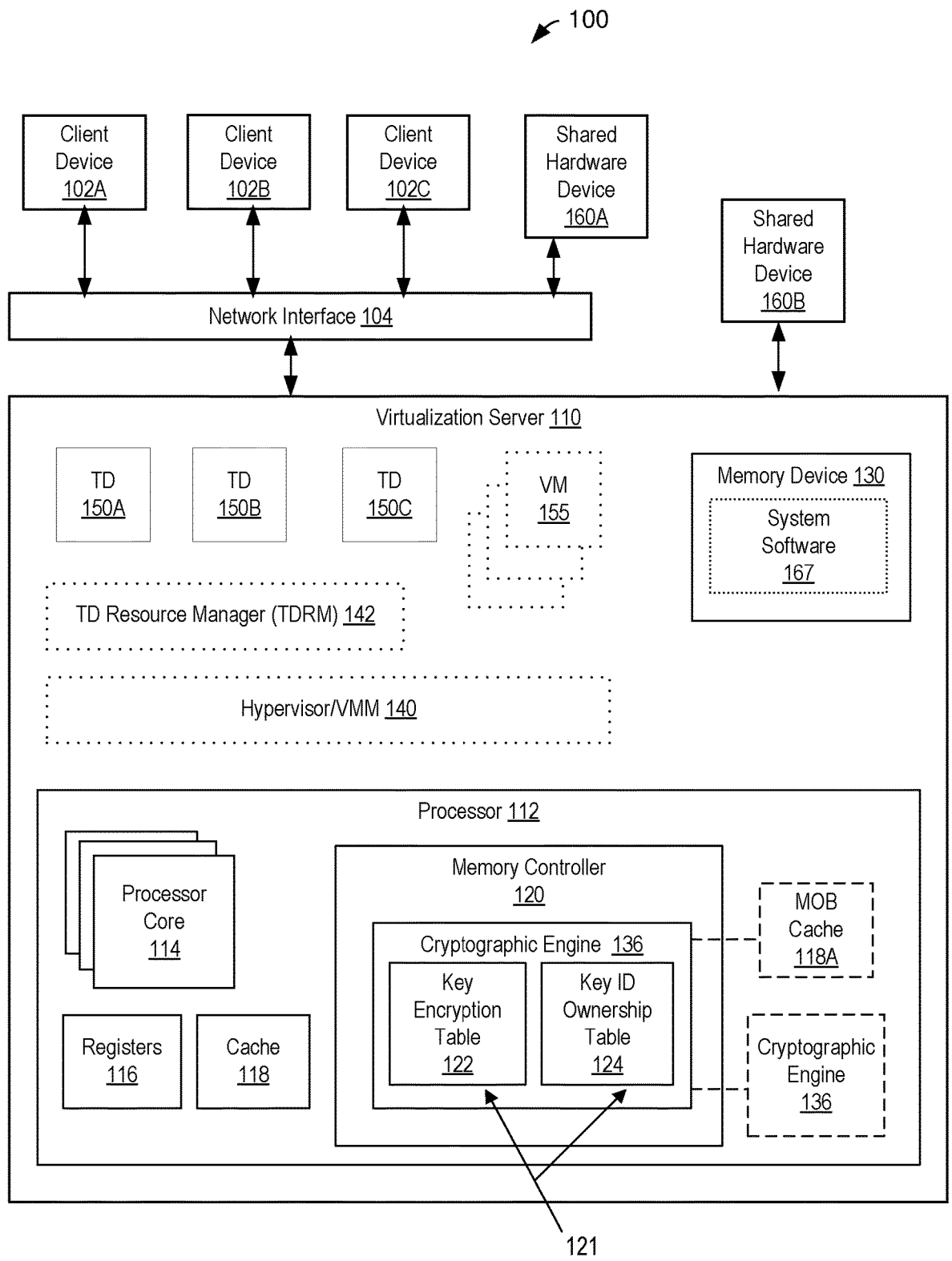
FIG. 1A is a schematic block diagram of a computing system 100 that provides isolation in virtualized systems using TDs, according to an implementation of the disclosure.

The present disclosure relates to methods, apparatus, systems, and non-transitory computer-readable storage media for integrity protection.

Aspects of the disclosure are directed to a memory controller of a processor that can tag cache lines stored in system memory with a memory ownership bit (MOB) also called a trust domain bit (TD-bit). The MOB, which may be included within metadata associated with the cache line, indicates whether or not the cache line belongs to a trust domain (TD). The ownership bit may be set upon write of the cache line in response to a determination that a key identifier (ID) located within a physical address of a write request belongs to a TD. Upon performing a read of the cache line, the access type of the key ID (e.g., whether or not is a TD key ID) in a read request is checked against a value of the ownership bit. If there is a mismatch, the memory controller may return, in response to the read request, a poison bit and invalid data that matches a fixed pattern (e.g., all zeros or all ones). In this way, an attacker does not get access to the encrypted data for the TD stored in the cache line. In various implementations, the added security provided by use of cache line-based ownership bits is provided in the context of a TD infrastructure that functions with multi-key total memory encryption (MK-TME) technology. The MK-TME technology is an extension of TME technology that provides support for multiple encryptions keys, allowing for compartmentalized memory encryption. For example, MK-TME technology provides an operating system (or a hypervisor, also called a virtual machine monitor (VMM), in a virtual computing environment) use of different encryption keys to encrypt pages of physical memory associated with different clients/applications. These clients/applications are generally referred to herein as virtual machines (VMs), one of which may be the hypervisor, although the clients/applications may be another type in different implementations. A TD infrastructure refers to allowing some VMs (referred to as TDs) to execute within highly-secured environments where even the operating system (or the hypervisor) may not have access to physical memory pages that belong to the TDs. The multi-key extension is particularly suited to work with multi-domain architectures, such as used by CSPs, because the number of supported keys may be implementation-dependent. In some implementations, the MK-TME technology includes integrity protection, e.g., via message authentication code (MAC) verification, and thus sometimes is referred to as MK-TMEi technology.

In the TD extensions (TDX) architecture, there can be multiple secure TDs corresponding to different client machines (e.g., VMs), guest operating systems, host operating systems, hypervisors (e.g., VMMs), and the like. Additionally, even different applications run by the same client within the same guest operating system may be executed securely. To ensure scalability of the secure computing when multiple TDs are present, each TD may use one or more private keys that are not available to software operating outside the TD. In some instances, software executing in one secure domain may have access to private keys specific to that particular domain and to shared keys that may be used by multiple domains. For example, a software running inside a secure domain can use a private key for its secure execution, such as read, write, or run operations. On the other hand, the same software can use a shared key to access structures or devices that are shared with other domains, such as a printer, a keyboard, a mouse, a monitor, a network adapter, a router, and the like.

While the cryptographic mechanisms implemented in an MK-TME engine are utilized to provide confidentiality and integrity to TD data, they are not sufficient to protect against all attacks. More specifically, untrusted software (e.g., CSP software) with access to TD ciphertext data can compromise the confidentiality and/or integrity of data, both through speculative and non-speculative means. These attacks are generally referred to as replay attacks, such as providing ciphertext data for a counter that tracks unsuccessful login attempts, to reset the counter and enable unlimited brute force attempts at cracking a password. In setting up a replay attack, an attacker can generate a dictionary of memory addresses indexed to ciphertext data, and then use this dictionary to later store the ciphertext to a particular memory location.

Cloud security providers (CSPs) driven by their customers' requirements are asking for cryptographic isolation for the customer workloads running on their platform. AMD announced SME (Secure Memory Encryption) and SEV (Secure Encrypted Virtualization) to meet these requirements for the cloud providers. In order to meet the competition and the ask from CSPs, Intel release specification of its solution, Trust domain extensions (TDX) for providing isolation on servers and removing the CSP software (VMM) from the trust boundary. TDX provides cryptographic isolation for customer workloads in a cloud environment using a multi-key total memory encryption engine (MKTME) which provides both confidentiality and integrity. While the cryptographic mechanisms implemented in a typical cryptographic engine are necessary to provide confidentiality and integrity to TD data, they are not sufficient. More specifically, untrusted software (e.g., CSP software) with access to TD ciphertext data can compromise the confidentiality and/or integrity of data (both through speculative and non-speculative means).

FIG. 1A illustrates embodiments of a computing system 100 that enables coexistence of TDX and MK-TME technologies on a virtualization server 110 supporting multiple client devices 102A, 102B, and 102C. The computing system 100 may further include a network interface 104 and shared hardware devices 160A and 160B. The virtualization server 110 may include, but not be limited to, a processor 112, memory device 130, and one or more TDs 150A, 150B, and 150C. The processor 112 may execute a virtual machine monitor (VMM) or hypervisor 140, a TD Resource Manager (TDRM) 142, which in turn may run one or more virtual machines (VMs) 155. In various implementations, the processor 112 may include one or more processor cores 114, one or more registers 116 (e.g., hardware registers), cache 118, memory ownership bit (MOB) cache 118A, and a memory controller 120, e.g., a memory management unit.

In one implementation, the memory controller 120 in turn includes a cryptographic engine 136 (such as an MK-TME engine in one implementation) having one or more key data structure 121 in which to store a key encryption table (KET) 122 and a key ownership table (KOT) 124, which are discussed in more detail with reference to FIG. 2. In another implementation, the cryptographic engine 136 is located in the uncore outside of the memory controller 120, yet coupled to the memory controller 120, as illustrated in dashed lines (as optional). The MOB cache 118A may be on-die cache for use by the cryptographic engine 136 to cache memory ownership bits from a sequestered range of the memory device 130, as will be discussed with reference to FIG. 4. In implementations, the memory device 130 is any of dynamic random-access memory (DRAM), synchronous DRAM (SDRAM), a static memory, such as static random access memory (SRAM), a flash memory, a data storage device, or a combination of such memory devices. For brevity, the memory device 130 is also simply referred to as memory 130.

In one implementation, the virtualization server 110 is a CSP host server running virtualization architecture, which runs both the MK-TME technology and the TDX architecture for efficient execution of client/tenant applications. For example, the host server may execute highly sensitive applications within TDs so that the hypervisor 140 does not have access to the memory pages and encryption keys allocated to a TD and the TD's trusted computing base (TCB). At the same time, the virtualization server 110 may run applications that demand less security and isolation using the MK-TME technology where the hypervisor 140 retains control over memory pages and encryption keys used in these less sensitive applications. The hypervisor 140 may then isolate different applications from each other using different MK-TME keys, but still remain in the TCB of each application.

Each client device 102A, 102B, 102C may be a remote desktop computer, a tablet, a smartphone, another server, a thin/lean client, and the like. Each client device may execute applications on the virtualization server 110 in one or more of the TDs 150A, 150B, and 150C and one or more VMs 155, where the VMs run outside the TCB of each respective TD. A hypervisor 140 may execute a virtual machine environment where the hypervisor leverages hardware capabilities of a host and is to execute one or more guest operating systems, which support client applications that are run from separate client devices 102A, 102B, and 102C. A single TD, such as the TD 150A, may provide secure execution environment to a single client 102A and support a single guest OS, in one implementation. In another implementation, one TD may support multiple tenants each running a separate virtual machine and facilitated by a tenant virtual machine monitor (tenant VMM) running inside the TD. The tenant VMM (not explicitly illustrated) may communicate with the hypervisor (host VMM) 140 to access the memory 130 and the processor 112. The execution state of the TDs 150A-C may be further enabled by the TDRM 142. The TDRM 142 may be an extension of the hypervisor 140 or as a separate resource that is supported by the hypervisor 140.

In implementation, the TDRM 142 and hypervisor 140 act as a host for TDs and control access of TDs to the processor 112 and other system hardware. The processor 112 may have one or multiple processor cores 114, hardware registers 116, and cache 118. The memory controller 120 may control memory operation, to include use of the cryptographic engine 136 to encrypt data being written to memory and decrypt data being read from memory with appropriate encryption keys. The processor 112 may have the capability to enter a TDX mode where TDX instructions are loaded into hardware registers 116 (such as control registers or model-specific registers) of the processor 112 to facilitate isolation of memory from any software that does not belong to the TCB of the TD. The TDRM 142 may enter into and exit the TDX mode. The TDRM 142 may act as a host and have control of the processor and other platform hardware. A TDRM 142 may assign software in a TD (e.g., TD 150A) with logical processor(s), but may not access a TD's execution state on the assigned logical processor(s). Similarly, the TDRM 142 may assign physical memory and I/O resources to a TD but not be privy to access/spoof the memory state of a TD due to separate encryption keys, and other integrity/replay controls on memory.

A TD represents a software environment that may support a software stack that includes VMMs, guest operating systems, and various application software hosted by the guest OS(s). Each TD may operate independently of other TDs and use logical processor(s), memory, and I/O assigned by the TDRM. Software executing in a TD may operate with reduced privileges so that the TDRM may retain control of the platform resources. On the other hand, TDRM cannot access data associated with a TD or in some other way affect the confidentiality or integrity of a TD.

The TDRM 142 (or a hypervisor portion of the TDRM) may perform management of the encryption keys. For example, the TDRM may assign different keys to different TDs, conFIG. keys on the memory encryption engines, call for the execution of cache flush when keys are to be reassigned to different TDs, and the like. In implementations of the disclosure, the TDRM 142 in the TD architecture acts as a host for the TDs and has full control of the cores and other platform hardware. A TDRM 142 assigns software in a TD with logical processor(s). The TDRM 142, however, may not have access to a TD's execution state on the assigned logical processor(s). Similarly, a TDRM 142 assigns physical memory and I/O resources to the TDs, but may not be privy to access the memory state of a TD due to the use of separate encryption keys enforced by the processor per TD, and other integrity and replay controls on memory. Software executing in a TD operates with reduced privileges so that the TDRM 142 may retain control of platform resources. However, the TDRM 142 may not be allowed to compromise the confidentiality or integrity of the TD by gaining access to the TD's trusted computing base.

To further improve security of data in TDs, the TDX architecture may employ K encryption keys that are securely generated. In one implementation, the TDRM 142 may cause the processor 112 (for example, using instruction TDCREATE) to generate an ephemeral memory encryption key and a corresponding key identifier (ID) for each TD. The encryption keys (e.g., K encryption keys) may be identified to software running on the processor by unique key IDs. In one implementation, a key ID for a TD may be appended to the physical memory addresses associated with that TD. The basic input/output system (BIOS) (or other startup firmware), during start up, may allocate a range of bits within the physical memory addresses for a particular number of key IDs. For example, the BIOS may store a range of bits in the hardware register 116, such as a model-specific register (MSR) in one implementation. After boot, the computing system 100 may retrieve the range of bits from the MSR and employ those bits to encode the key IDs within the physical memory addresses.

In various implementations, each key ID could be any number having a binary representation. For example, a range of K consecutive numbers, beginning from 0 and ending with K−1, may be used in one implementation. In another implementation, the range of the numbers used for representations of encryption key IDs may start from a different number. The range need not be contiguous in some implementations. A binary encoding of the encryption key IDs may include M bits wherein M may be an integer such that $M \geq \log_2 K$, to ensure that the total number $2^M$ of various combinations of M bits is not less than the number K of different encryption keys.

Physical pages of the memory 130 may be encrypted with one of the encryption keys. As discussed, the key ID indicating the encryption key used for memory encryption may be added to the physical memory address of the physical page of the memory, e.g., physical memory of the host server, which will be explained in more detail below. With the key IDs appended to the physical memory addresses, a memory operation requested by software may fail unless the memory operation request includes both the physical memory address of the page and the correct key ID for the encryption key used to encrypt/decrypt the physical page of the memory. The memory operation may be a "read," "write," or "execute" operation involving the physical page of the memory, which may relate to cache line in the memory 130.

The concatenation of the restricted key ID to the physical memory addresses of the physical memory allocated to the TD for private use may prevent unauthorized or unsecured accesses to such memory. In order to maintain hardware isolation of restricted encryption keys from non-restricted encryption keys, the processor 112 may need to enable partition of key IDs into restricted TD key IDs (e.g., allocated to TDX) and non-restricted MK-TME key IDs (e.g., allocated to the hypervisor, TDRM, OS, or other software outside the TCB of TDs) and maintain this partition during the execution of the TDX architecture in one or more data structures (such as micro-architectural tables, for example) stored inside the processor. In some implementations, boot up software or firmware (e.g., BIOS) may set up such a partition and store an identification of the partition in one of the hardware registers 116 of the processor 112 that may be software accessible after boot of the computing system 100. This allows the system to run both the TD architecture and the MK-TME technology within the host server to enable highly secure virtual machines running inside TDs as well as unmodified VMs protected by the MK-TME mechanisms.

To maintain isolation from software (such as the hypervisor 140), the partition of key IDs into restricted and non-restricted may be static, in one implementation. If, during post-boot execution, it is determined that a different partition of key IDs may be optimal, a post-boot software (e.g., the hypervisor 140) may request key ID repartitioning. This may be advantageous, for example, if the number of applications requiring highly secure execution has increased. In some implementations, this may be done by the post-boot software initiating a handshake mechanism with the boot-up firmware/software requesting modification of the key ID partition. Upon completion of the handshake and determining the new desired partition of key ID space, the TDRM 142 may save a state of execution of TDs currently running on the processor using the key IDs and perform a system reboot. This may provide flexibility to define partition of key IDs between MK-TME and TDX based on the workload and the current state of the computing system.

The hypervisor 140 may assign logical processors, physical memory, encryption key IDs, I/O devices, and the like to TDs, but may not access the execution state of TDs and/or data stored in physical memory assigned to TDs. The processor 112 may utilize the cryptographic engine 136 to use restricted encryption keys to facilitate secure data storage and handling. For example, the cryptographic engine 136 may encrypt data before moving it from one or more registers 116 or cache 118 to the memory 130 upon executing a "write" code. Conversely, the cryptographic engine 136 may decrypt data when the data is moved from the memory 130 to the processor 112 following a "read" or "execute" command.

Each processor core 114 of the processor 112 may support one or more hardware threads corresponding to logical processors. The logical processors supported by the processor cores 114 may be assigned to the TDs 150A-C by the TDRM 142 in some implementations. In addition to the TDX-based implementation of client virtual machines, the virtualization server 110 may execute one or more VMs 155 outside TDs for one or more client devices 102A-C. Whereas software outside trust computing base of the TDs—such as the TDRM 142 and hypervisor 140—may not have access to physical memory pages allocated to TDs and/or execution state of TDs, the virtual machines operating outside TDs may not be secure against accesses by the hypervisor 140. Nonetheless, the virtual machines operating outside the TCB of each TD may still be secure from software accesses originating from TDs or other virtual machines. In some implementations, such access may be prevented by the cryptographic engine 136 encrypting data moving between the processor 112 and the memory 130 with one or more non-restricted encryption keys. The term "non-restricted" is meant to refer to a key accessible to the hypervisor 140. On the other hand, the unauthorized TDs and VMs may be prohibited from using such keys for memory operations, in some implementations.

Additionally, in at least some implementations, one or more of the non-restricted keys may be shared. Shared keys may be accessible by two or more entities, such as TDs and VMs running outside the TDX environment. Shared keys may be used to access one or more shared structures, such as shared hardware devices 160A and 160B, which may be a printer, a keyboard, a mouse, a monitor, a network adapter, a router, and the like. For example, to print an image or a text page, a software operating in a TD 150A may need to encrypt data with a shared key and store the encrypted data in memory 130 before transmitting the data to a shared hardware device. A shared hardware device 160A may be connected to the virtualization server 110 via a network interface 104, in one implementation. In another implementation, a shared hardware device may be local to the virtualization server 110, as illustrated, for example by the shared hardware device 160B.

The memory controller 120 to control data exchanges between the processor core(s) 114, registers 116, cache 118, and memory 130. In some implementations, the KET 122 is used to store encryption keys and key IDs of the encryption keys and the KOT 124 is used to store allocations of the key IDs to TDs. The memory controller 120 may also be coupled to the VMs, which run outside the TDX architecture.

Figure 1B:
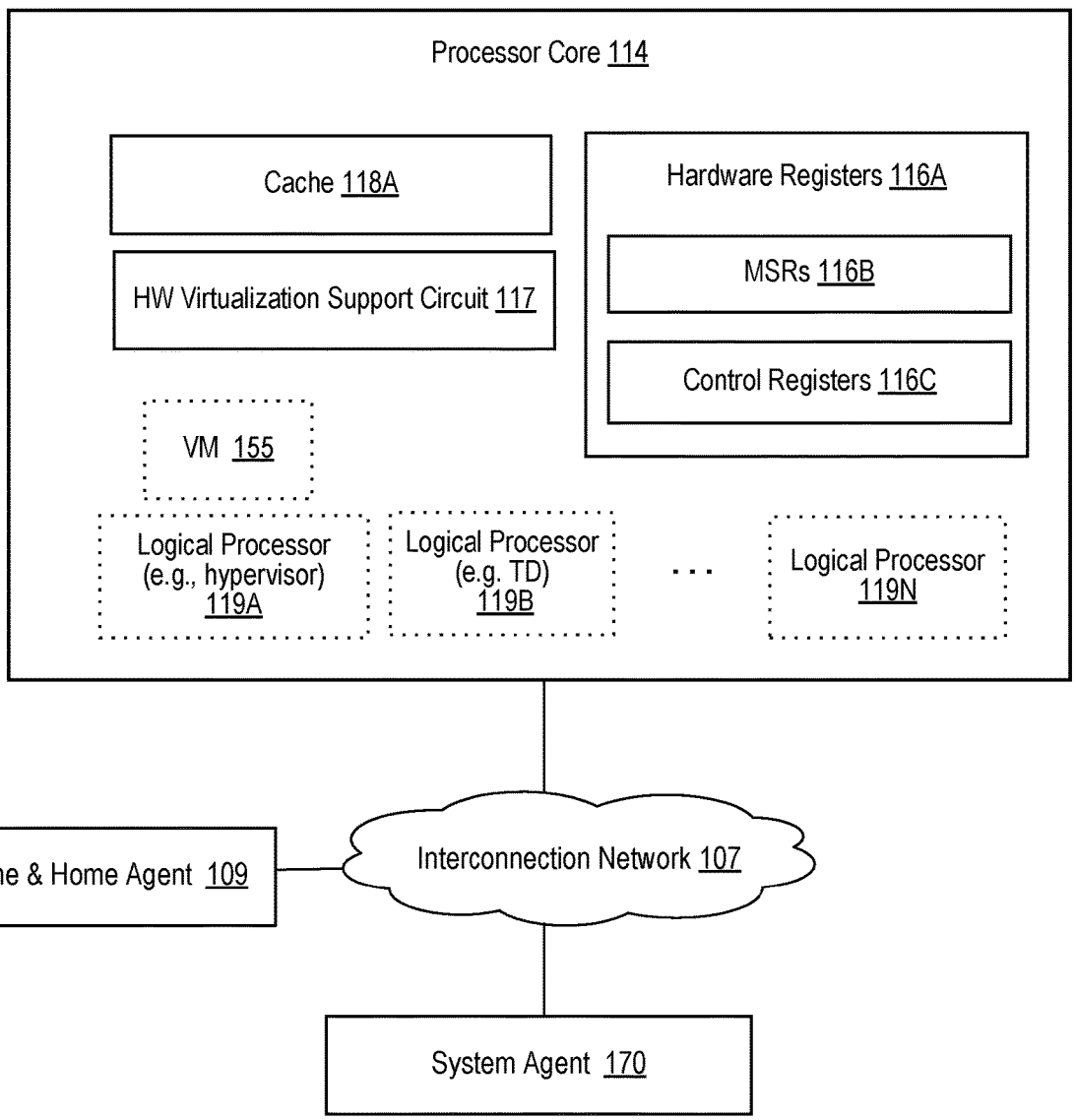
FIG. 1B is a schematic block diagram of a detailed view of a processor core executing a TDRM in communication with a MOT and one or more trust domain control structure(s) (TDCS(s)) and trust domain thread control structure(s) (TDTCS(s)).

FIG. 1B is block diagram illustrating an example processor core of a processor of a computing system that enables coexistence of TD architecture with MK-TME technology, according to one implementation. In the implementation illustrated in FIG. 1B, each processor core 114 may include MOB cache 118A, a hardware virtualization support circuit 117, and hardware registers 116A. Each processor core 102 may communicate via an interconnection network 107 on a multi-core processor package with a corresponding cache and home agent (CHA) 109 and with one or more system agents 170 that exist off the multi-core processor package. The CHA 109 may cache a copy of a cache line of memory that is homed in (e.g., local to) that memory at a cache line granularity. In different implementations, the interconnection network 107 is a Peripheral Component Interconnect (PCI™) bus, such as the Peripheral Component Interconnect express (PCIe™) bus, or another custom bus. The system agents 170 may include disk storage, device drivers, I/O devices or the like.

The processor core 114 may execute instructions to run a number of hardware threads, also known as logical processors, including the first logical processor 119A, a second logical processor 119B, and so forth until an Nth logical processor 119n. In one implementation, the first logical processor 119A is a virtual machine monitor (VMM) or hypervisor. A number of virtual machines (VMs) 155 may be executed and controlled by the VMM. Additionally, as discussed, the VMM may assign key IDs, which are associated with corresponding encryption keys, to various secure domains (e.g., VMM, VMs) operating on the computing system 100.

With further reference to FIG. 1B, the hardware registers 116A may include, for example, a number of general purposes registers (not illustrated, e.g., EAX, EBX, ECX, EDX, and the like), model-specific registers 116B (or MSRs), and control registers 116C (e.g., CR1, CR2, CR3, and the like). In one implementation, the computing system 100 is a server that services the domains, e.g., different workloads such as a client machine, an operating system, an application, or other types of workloads being supported.

With additional reference to FIG. 1A, and in various implementations, the cryptographic engine 136 is embodied as a microcontroller, microprocessor, functional block, logic, or other circuit or collection of circuits capable of performing the functions described herein. The cryptographic engine 136 may cache the internal key data structure 121, which the cryptographic engine 136 may use to identify domain accesses to be protected. The key data structure 121 may be a table or other data structure capable of being indexed and stored within hardware of the cryptographic engine 136. In one implementation, the hardware is a cache, a set of registers, or other flash memory.

In various implementations, the key data structure 121 may be controlled and/or programmed by hardware of the cryptographic engine 136 or by trusted software, for example using a crypto engine programming support circuit of the processor 112. The key data structure 121 may be adapted to store keys and domain information for the domains, as will be discussed in more detail with reference to FIG. 2. The encryption keys and/or other secret information of the key data structure 121 may not be available to untrusted software, e.g., OS or VMM. In some implementations, the cryptographic engine 136 may be incorporated along with the memory controller 120 and the processor core 114 in a system-on-a-chip (SoC) of the computing system 100.

The encryption keys and key IDs associated with the encryption keys may be enabled by the cryptographic engine 136 conFIG.d by BIOS, upon boot of the computing system 100, using a ME activate (ME_ACTIVATE) MSR within the hardware registers 116. To enable MK-TME, TME Enable RWL bit in the ME_ACTIVATE MSR may be set and bits 35:32 may be set to non-zero values that specify the number of key ID bits conFIG.d for MK-TME. These MK_TME_KEYID_BITS are the number of key ID bits to allocate to MK-TME. Similar to enumeration, this is an encoded value. Writing a value greater than the enumerated number of maximum supported KeyID bits may result in general protection fault (#GP). Writing a non-zero value to this field results in a general protection fault if bit 1 of EAX (TME Enable) is not also set to '1,' as TME is to be enabled to use MK-TME. The ME_ACTIVATE MSR may also be used to lock other TME-related MSRs (e.g., EXCLUD_MASK, EXCLUDE_BASE), so that any write to the registers after they are locked will be ignored. The lock may be reset when the computing system 100 is reset.

In some implementations, when the computing system 100 is booted, the BIOS may store particular information in the ME_ACTIVATE MSR for later use by the processor 112 (e.g., the memory controller 120) in restricting access to the restricted encryption keys and key IDs. This information may include a value for a number of address bits of physical memory addresses (e.g., host physical addresses) used for key IDs. The particular information stored by BIOS into the ME_ACTIVATE MSR may further include a partition identifier (e.g., a partition key ID) to partition key IDs into non-restricted key IDs and restricted key IDs. Furthermore, in one implementation, a second number of restricted bits of the physical memory addresses may be stored in the ME_ACTIVATE MSR that specifies how the restricted key IDs are partitioned from the non-restricted key IDs.

Figure 2A:
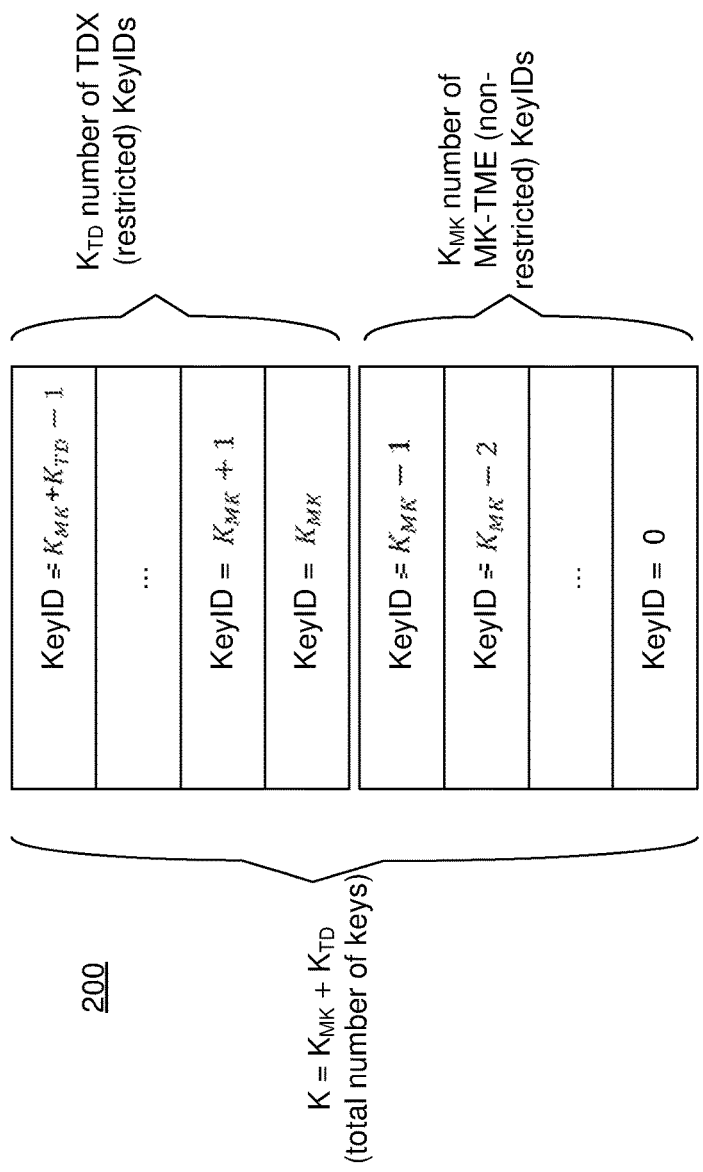
FIG. 2A illustrates encryption key ID space partitioning into TDX and MK-TME key IDs, in one implementation, with a single boundary separating non-restricted key IDs from restricted key IDs.

FIG. 2A illustrates encryption key ID space partitioning 200 into TDX and MK-TME key IDs, in one implementation, with a single boundary separating non-restricted key IDs from restricted key IDs. On boot, the processor 112 may store, within an MSR of the registers 116, a bit range for the key ID encoding. The bit range may support K key IDs to identify K encryption keys. The processor 112 may further identify, within the MSR, the space partitioning 200 of the key ID space. In one implementation, K key IDs may be partitioned into $K_{MK}$ non-restricted key IDs and $K_{TD}$ restricted key IDs, so that $K_{MK}+K_{TD}=K$. The non-restricted key IDs may be MK-TME key IDs allocated to the hypervisor 140 (e.g., for allocation to shared devices) in a virtualization implementation illustrated in FIG. 1A. The restricted key IDs may be allocated to the TD infrastructure and then further allocated to one or more TDs 150A-C.

In one implementation, key IDs may be mapped onto a contiguous interval of integer numbers ranging from 0 to K−1. The non-restricted key IDs may map onto the lower set of contiguous numbers ranging from 0 to $K_{MK}-1$, with the restricted key IDs mapping onto the higher set of contiguous number ranging from $K_{MK}$ to K−1. In the implementation illustrated in FIG. 2A, one boundary between restricted and non-restricted key IDs is defined, e.g., residing below the key ID=$K_{MK}$ line. While partitioning the key ID space into two contiguous ranges may be advantageous in some instances, in other implementations multiple boundaries may be defined such that multiple regions of non-restricted key IDs are interspaced with regions of restricted key IDs.

Figure 2B:
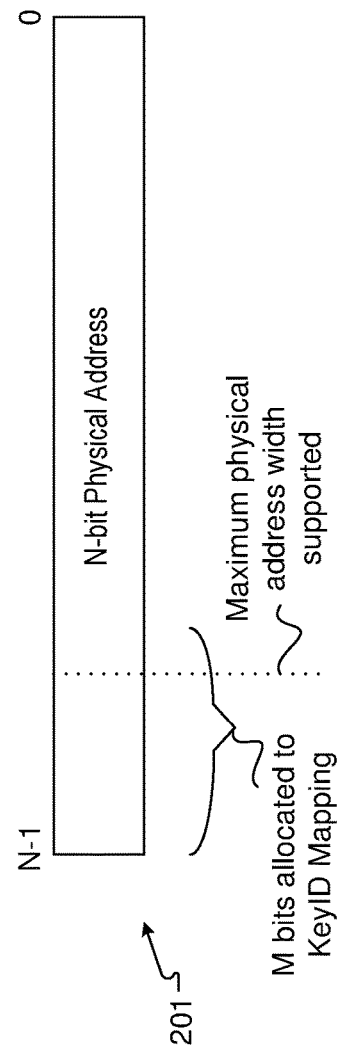
FIG. 2B is a block diagram of an n-bit physical memory address that includes a portion of the address bits allocated to key IDs according to various implementations.

FIG. 2B is a block diagram of an n-bit physical memory address 201 that includes a portion of the address bits allocated to key IDs according to various implementations. This portion of address bits may encompass M bits, which may be at least $Log_2 K$. The dotted line in FIG. 2B illustrates a maximum physical address width that is supported. Accordingly, use of at least some of upper address bits of the physical memory address to encode for key IDs may be advantageous. In other implementations, however, the M bits for the key IDs may be located elsewhere within the physical memory address, including beyond the maximum physical address width.

The number of boundaries may be even greater for other partition implementations. In one implementation, restricted keys may be interspaced with non-restricted key IDs one after another. This may happen, as a way of example, if only the lowest bit of the M bits used for key ID encoding is a restricted bit. Provided that this lowest bit is set for restricted key IDs and clear for non-restricted key IDs, every even (and $0^{th}$) key ID is a non-restricted key ID and every odd key ID is a restricted key ID. In such implementation, the number of restricted key IDs is the same as the number of non-restricted key IDs.

In MK-TME architecture (with or without TDX), each memory page may be encrypted with one of the encryption keys. The processor 112 may enforce encryption key usage via the memory controller 120. The memory controller 120 may include or be coupled to the key data structure 121, which includes a number of tables illustrated in FIG. 2 to enable such enforcement. For example, the memory controller may include the KET 122, which stores mappings of encryption keys to key IDs, as illustrated in FIG. 2 for one implementation where K=128 total keys and $K_{TDX}$=96 restricted keys. In one implementation, encryption keys 255 may be 128-bit keys. The KET 122 may be indexed by the key IDs 250. The partition of key IDs (and, hence, of the encryption keys) may be implemented as described above. When a memory operation is directed at a physical memory address of a physical page of the memory, the processor may extract the key ID from the upper M bits of the physical memory address used for key ID encoding. The processor may then reference the KET 122 to determine which encryption key is to be used to decrypt or encrypt the physical page of the memory.

In some implementations, an additional row of poison status bits 260 is added to the KET 122, where each status bit of the poison status bits 260 indicates whether a corresponding key and key ID pair have been poisoned. The poison status bit may be set in cases where, although a memory ownership bit (MOB) has matched the access type during a memory read request, there is a MAC mismatch. (Note that any reference to a "read request" herein should be construed to also include an "execute request" as both access cache lines of the memory 130). The MAC mismatch may be an indication of attempts to build a dictionary of encrypted data and/or brute force attempts to find a match to for the MAC stored with or in association with a cache line.

In various implementations, once a key has been poisoned in this way, the cryptographic engine 136, in response to a memory access request (e.g., write, read, execute) using a corresponding poisoned key ID, returns an integrity failure to the requesting agent. In one implementation, the KET 122 is a micro-architectural hardware table for configuring the cryptographic engine 136. The partition of KET 122 into TDX keys and MK-TME keys may be performed by the TDCONFIGKEY instruction. In some implementations, the poison status bit is cleared by executing a PCONFIG (or similar processor configuration instruction) to reprogram the key ID for use with a new key, but the old "poisoned" key is now invalid and will not be used again. In this way, an attacker cannot access data using a poisoned key at any time in the future.

The memory controller 120 may also include or be coupled to the KOT 124 (FIG. 2). The KOT 124 may store the allocations 265 of key IDs 250 to various TDs and software running outside the TCB of each respective TD, such as the hypervisor 140. The KOT may be indexed by key ID 250, in one implementation. For each key ID 250, the KOT 124 may store a reference to an entity to which the key ID 250 is currently assigned. For example, the first non-restricted key ID=0 may be allocated to the hypervisor 140 to encrypt the physical memory pages used in hypervisor root operations. A number of other non-restricted key IDs 250 may be further allocated to, or for use by, the hypervisor 140. The hypervisor may further allocate some of the non-restricted key IDs 250 to other applications, such as the VMs 155 running outside the TDX architecture. The KOT 124 may also store allocation of restricted key IDs to various executed TDs: TD1, TD2, TD3, and so on. More than one restricted key ID 250 may be allocated to the same TD. Some of the restricted key IDs 250 may not be assigned to any TDs but may be reserved for a later use, as needed.

In implementations, the KOT 124 is a micro-architectural hardware table for managing the TDX and MK-TME inventory, in particular for assigning key IDs 250 to TDs 150A-C, revoking key IDs 250, and controlling flushing cache 118 before reassigning key IDs 250 to different TDs. The KOT 124 may provide hardware protection against multiple concurrent assignments of the same TDX key IDs to different TDs.

In implementations, the KET 122 and the KOT 124 are combined into the same key data structure 121 as both are indexed by the key IDs. Further, the memory controller 120 and/or the cryptographic engine 136 may reference either or both of the KET 122 and the KOT 124 in order to determine whether a key ID located within the physical address of a memory operation is a TD key ID. Because the KET 122 and the KOT 124 are implemented in the hardware of the processor 112, these tables are not directly accessible by software. This allows the processor 112 to track the proper operation of the software and guarantee the TDX security objectives.

In various implementations, when the memory controller 120 detects a memory operation directed at a physical page of the memory allocated to a specific TD, the memory controller 120 may generate a fault and/or abort procedure in a number of situations, including but not limited to the following: 1) A memory operation that includes a non-restricted ID concatenated to the physical memory address whereas the physical page of the memory is a private page allocated to a TD. 2) A memory operation that includes a wrong restricted key ID concatenated to the physical memory address for which a different restricted key ID is expected. 3) A memory operation that includes a correct restricted key ID concatenated to the physical memory address, but the memory operation is initiated by a software program outside the TCB of the TD to which the restricted key ID is allocated (e.g., the memory operation that is initiated by the hypervisor 140 or by a software program executing inside a different TD).

In particular, in the first situation, a trusted software executing in the TD 150A may erroneously concatenate a non-restricted (either shared or non-shared) MK-TME request key ID to the physical memory address of a private physical page of the memory which is encrypted (or is expected to be encrypted—in case of a write operation) with one of the restricted TDX keys allocated to the TD 150A. In this case, the memory controller 120, via the cryptographic engine 136, may detect that none of the restricted bits of the request key ID is set and that, therefore, the request key ID is not one of the restricted key IDs.

Correspondingly, the memory controller 120 may generate a fault, e.g., a non-restricted key page fault, in response to a determination that at least one of the restricted bits of the request key ID is set (or clear, in some implementations, as discussed above). The fault may be used to inform the software program which initiated the memory operation that a non-restricted key has been used where a restricted key is expected. In some implementations, the memory controller 120 may further detect that the memory operation originated outside a trust computing base of the TD 150A (for example, an operation from one of TDs 150 B-C, one of VMs 155 operating outside a TD, a hypervisor 140, and so on) and generate silent abort-page semantics. In some implementations, this may mean that write operations are silently ignored whereas read operations return invalid data with a fixed pattern, e.g., bits of all zero values or all one values.

Figure 3:
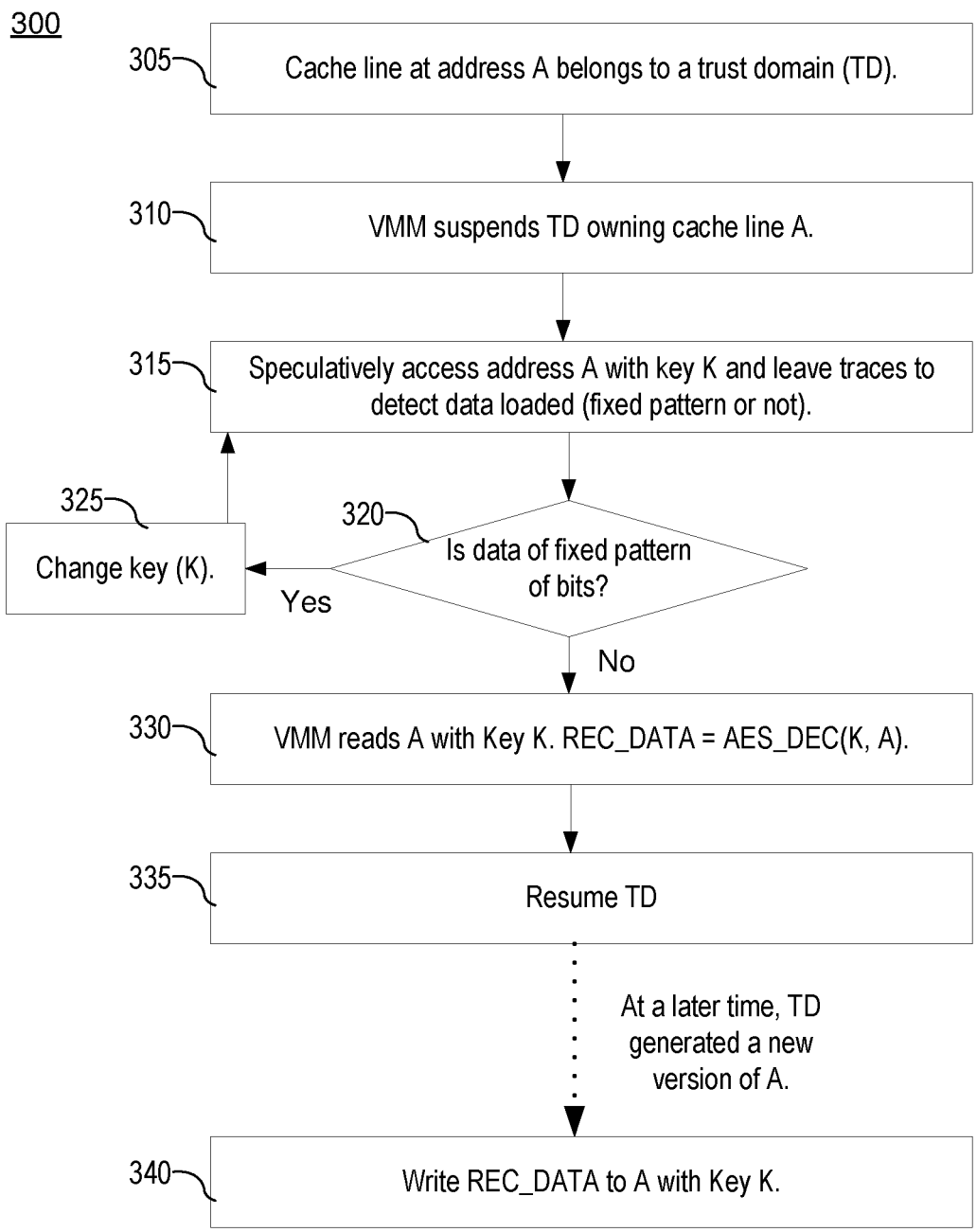
FIG. 3 is a flow chart of a method 300 for conducting a software attack on a TD, according to one implementation.

FIG. 3 is a flow chart of a method 300 for conducting a software attack on a TD, according to one implementation. Although using the VMM 140 as an example, the attack may be performed by processing logic executing on a CSP component or device or a component or device communicating remotely through the CSP component or device. In the attack scenario of FIG. 3, there is a cacheline at physical address A belonging to a TD (305). The VMM 140, which is still in control of scheduling decisions, suspends the TD owning this cacheline (310). The VMM 140 may further create a code sequence to allow it to access this cacheline speculatively (315). It is easier to attack with speculative access because an integrity failure does not result in a machine check exception (MCE). It would therefore take more time to do the attack if performed non-speculatively and have to wait for MCEs to clear.

In implementations, considering that the cacheline is integrity protected, the VMM 140 access to the cacheline results in an integrity failure as the VMM 140 does not know the key that is used by the TD. Integrity failure by asserting a poison bit in a cache line sent to the core 114. The poison bit is currently what is used to indicate uncorrectable error correction code (ECC) errors from the memory 130. Along with poisoning the data, the data is returned as a fixed pattern of bits, e.g., could be all zero values, all one values, or every other bit is a zero value and a one value, among other possibilities. When poisoned data is consumed on the core, it results in an MCE. Note that there can be other ways to signal integrity failures back to the core and the attack highlighted here can be adapted to the particular method chosen by the implementation.

In implementations, the VMM 140 may determine whether the data being returned is of the fixed pattern of bits (320). If yes, then the VMM 140 knows that key is incorrect and changes the key (325). With a different key, the VMM 140 can repeat the access attempts to cacheline A (315), which attempts may be performed until finding a key that generates the same MAC that was generated using the TD key for the ciphertext at address A. Note that the number of attempts that might be required to accomplish this successfully depends on the strength of the MAC. But, because the MAC is much smaller than the data, there will be collisions eventually, and the abilities of quantum computers make performing this attack more viable because brute force guessing can be done in shorter periods of time. Smaller MACs, furthermore, increase the probability of finding such collisions and hence increase the likelihood of this attack to succeed.

For the VMM 140 to not get detected through integrity failures, the access to TD data can be done speculatively and the VMM can leave traces behind to detect whether a particular attempt was successful or not. In the particular implementation where poisoned and zeroed data is returned to the core, the VMM 140 can leave traces to indicate data loaded without the fixed pattern of bits, which would indicate that the attempt succeeded. An example of such trace could be where the VMM 140 loads a specific memory location on detecting the data from A without the fixed pattern, and then in the non-speculative path, load the same location and measure the access time to determine whether the location is in the cache or not. Using these side channels, a VMM 140 may determine when it has found a key that generates a colliding MAC for that data generated with the TD's key. The VMM can record this data and key used to generate the colliding MAC (330). The VMM 140 may then resume the TD to allow the TD to continue executing (335).

In the current attack scenario, at a later point in time, when the TD has written new values to A, the VMM 140 uses the colliding key and recorded data it found and write to A (340). This write may restore the ciphertext in TD's domain that the VMM 140 had recorded earlier, thereby successfully replaying stale data to the TD. Note that the attack may be targeted to locations where replay can result in breaking the security of the TD, such as is the case of replaying a counter value that tracks unsuccessful login attempts into a computer, device, or application. In this way, an attacker may have virtually unlimited attempts at logging in and brute force determine the password.

Note that while the attack described above uses a fixed pattern of bits in data on integrity failure as a side channel to detect integrity failures, there can be other side channels to detect integrity failures in other implementations, making these attacks broadly applicable to different implementations. Additionally, the attack that is discussed with reference to FIG. 3 may also be done non-speculatively by the VMM 140. The VMM in this case can simply use the MCE on the processor core to detect integrity failures without having to rely on the poison bit or fixed data pattern indication. In other implementations, there are other known attacks where the VMM 140 can discover plaintext data knowing just the ciphertext data or changed to ciphertext data. As an example, the VMM 140 may construct a dictionary of ciphertext values using frequency analysis to determine plaintext data at a particular location in a TD.

Accordingly, there are multiple attacks that can be conducted if untrusted software is allowed even ciphertext-based access to data that needs to be secured and isolated from the untrusted software (e.g., VMM, in the example scenario, although other untrusted CSP-based software also present risks).

To defend against attacks where untrusted software uses ciphertext alone to mount attacks (e.g., confidentiality leaks building a dictionary) in some implementations a memory ownership bit is used. The memory ownership bit is set at the time of write depending on whether a TD KeyID or non-TD KeyID was used. On a read, the ownership bit read from memory along with the request cacheline is verified against the original request.

Detailed herein are embodiments which allow for integrity protected access control to provide defense against deterministic software attacks. Software attacks such as rowhammer attacks which target the TD bit itself are defended against using cryptographic integrity which the data itself is protected by the TD-bit alone. As such, software is reduced to performing only non-deterministic attacks (e.g., random corruption), but all the deterministic attacks are defended against. Additionally, integrity-protected access control bits are protected against simple hardware attacks where the adversary with physical access to the machine can flip TD bits to get ciphertext access in software which can break confidentiality.

To address the attacks stemming from access to ciphertext, prior solutions have deployed hardware access control. More specifically, the core hardware implements a range register and blocks accesses to the range from software not in the trusted computing base (TCB). Using a TD-bit along with memory integrity for data provides the desired security protection, but it comes at the cost of both storage and performance overheads. The MAC is associated on a per cacheline basis and even with a 32b MAC per cacheline, a percentage of the total memory is lost at boot time. Additionally, the MAC needs to be fetched on reads and updated on writes resulting in additional performance overheads as well.

Detailed herein are embodiments of integrity protected access control. With this option, the access control bits, or TD-bits, are protected with cryptographic integrity. On a read to memory, the data is fetched along with the associated TD-bit. TD-bit associated with cachelines are stored in sequestered memory and need to be fetched as well. A single cacheline of TD-bits fetches TD-bits for 512 data cachelines resulting in efficient utilization of any metadata cache that is implemented by the solution. Integrity protected access control is exposed to software through architectural MSRs and programmed by software using a key programming instruction extended in this invention. The BIOS is responsible for selecting this mode and activating it for use by software.

Embodiments detailed here provide protection against deterministic software attacks. These are attacks where the software can compromise the security in a deterministic way. As an example, allowing access to ciphertext can allow software to create a dictionary of ciphertexts and break confidentiality. By preventing access to ciphertext, ciphertext leakage attacks which can be done by software using rowhammer to flip are defended TD bit associated with a cacheline are defended. With the proposed invention, an attempt by software to flip TD bit(s) using rowhammer will be detected as an integrity error as the TD-bits are cryptographically protected. Cryptographic integrity also provides protection against hardware attacks where an attacker with physical access to the machine can flip TD bits to bypass protection provided by the TD-bit.

Figure 4:
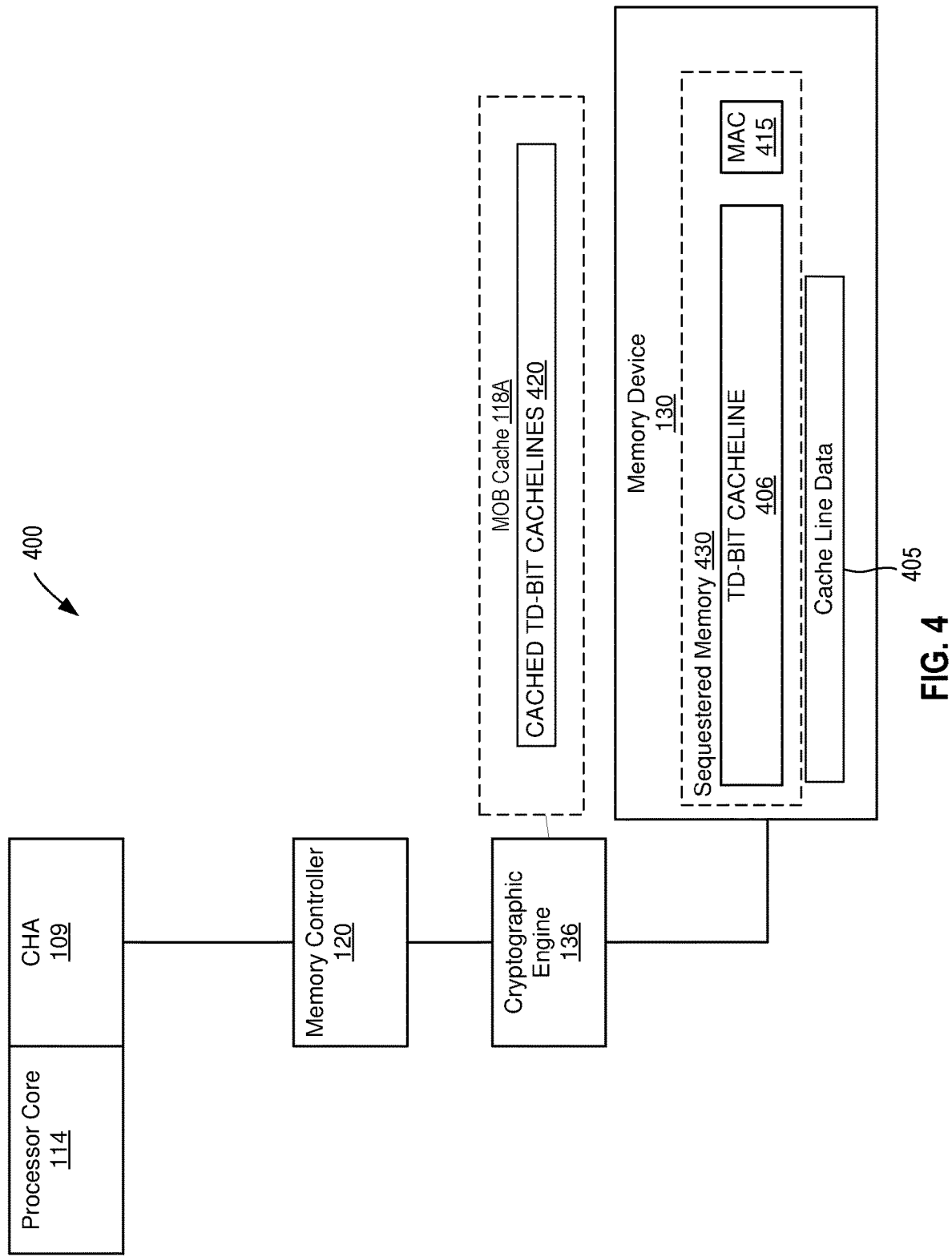
FIG. 4 illustrates embodiments of system that utilizes TD-bits.

FIG. 4 illustrates embodiments of system that utilizes TD-bits. In various embodiments, the flow of a write or read request (which includes an execute request) from the processor core 114 includes the CHA 109, the memory controller 120, and/or the cryptographic engine 136 communicating with cache lines in the memory 130. The memory device 130 stores cacheline data 405 and, in sequestered memory 430, TD-bit cachelines 406 and associated MACs 415. In some embodiments, TD-bit cachelines 406 comprises a plurality of TD-bits). Note that depending on the layout (as discussed in FIGS. 5(A)-(B)) the MACs 415 may be adjacent to the TD-bit cachelines. To optimize performance, an internal TD-bit cache 118A caches the TD-bits cachelines 420 according to a metadata layout.

Figure 5A:
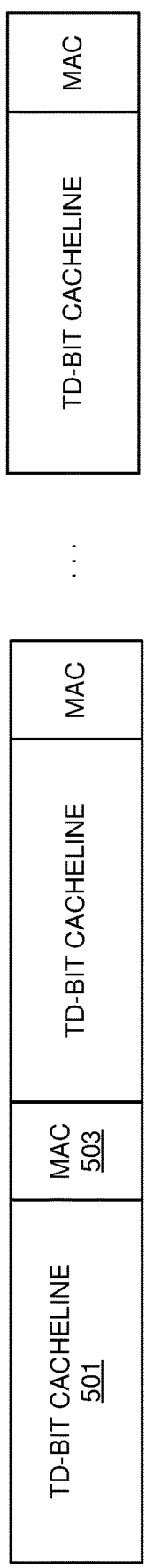
FIGS. 5(A)-(B) illustrate embodiments of metadata layouts for the integrity protected TD-bits.
Figure 5B:
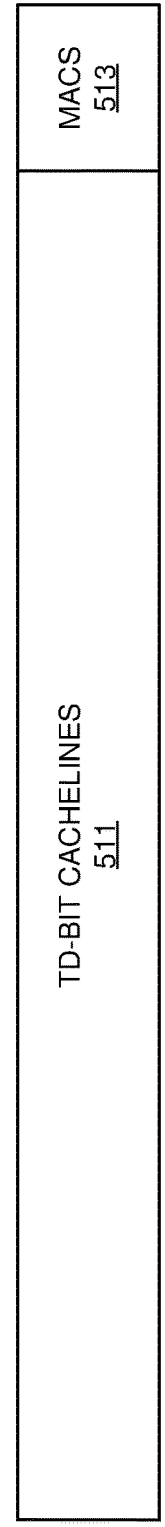

FIGS. 5(A)-(B) illustrate embodiments of metadata layouts for the integrity protected TD-bits. FIG. 5(A) illustrates a first layout where the MAC 503 is stored with a TD-bit cacheline 501 in a single cacheline. With a 32-bit MAC, each 512-bit cacheline in the access control bits space will store TD-bits for 480 cachelines. With this embedded metadata layout, a fetch of a TD bit also fetches the MAC associated with it in one access. However, with this layout the address calculations in the cryptographic engine 136 are non-trivial and may require an additional cycle latency for the calculations.

FIG. 5(B) illustrates a second layout where each TD-bit cacheline 511 stores TD bits for 512 cachelines and is associated with a MAC 513 in a separate stolen space (sequestered memory 430). With this disjoint layout, the MACs 513 are stored in a separate region and the TD-bit cacheline 511 and the associated MAC 513 need to be fetched separately in two different accesses which can result in increased performance overheads.

With the embedded MAC layout, the MAC can be discarded once the line is cached as the MAC is associated with the TD cacheline itself and not needed for other accesses. However, with the disjoint MAC layout, the MACs are stored in a separate region and hence will bring MAC for multiple TD lines depending on the size of the MAC making it useful to cache both the TD cachelines and the MAC cachelines to minimize memory accesses for future memory accesses.

Figure 6:
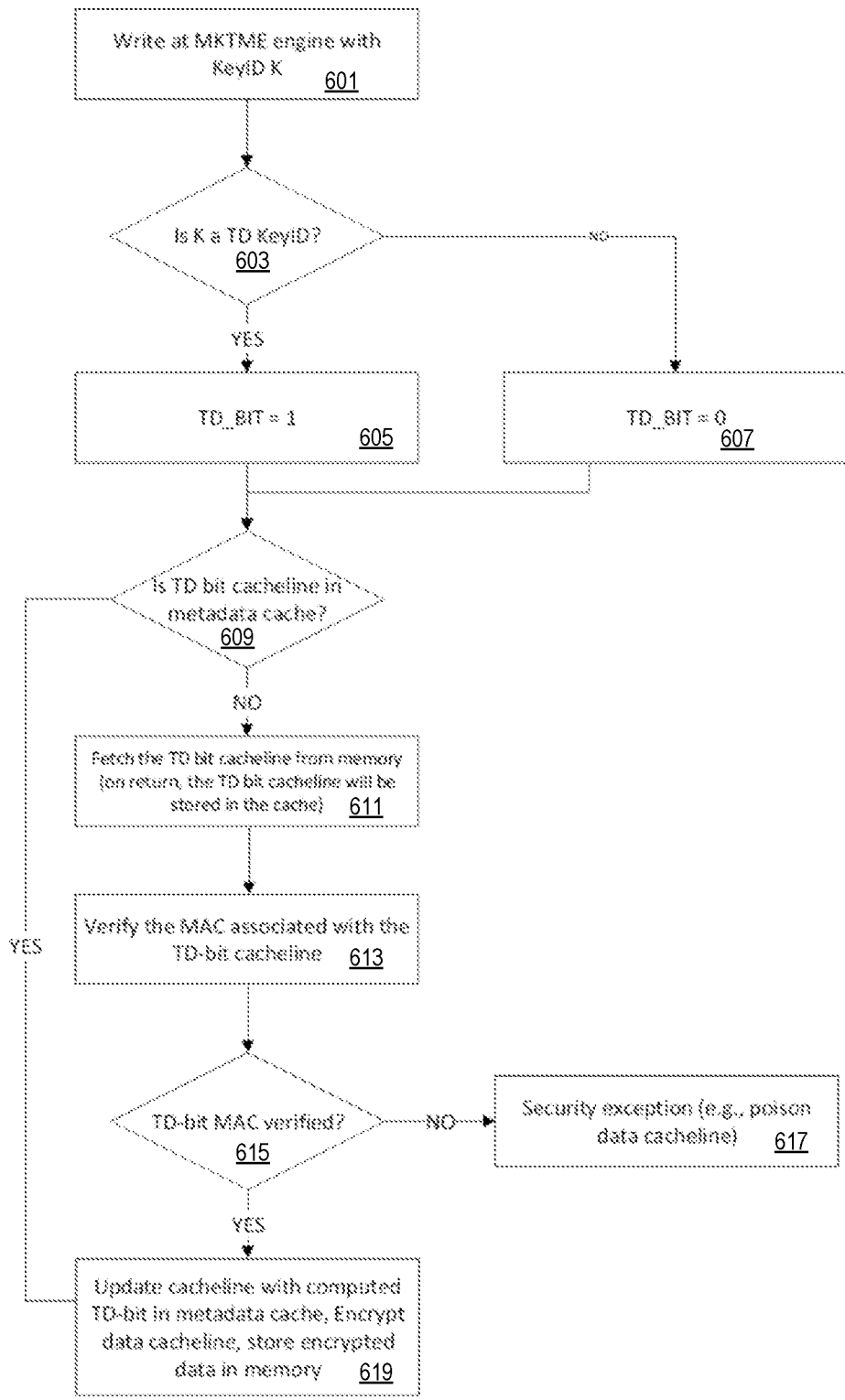
FIG. 6 illustrates embodiments of a method of a handling a write request.

FIG. 6 illustrates embodiments of a method of a handling a write request. A write request is received by the cryptographic engine 136 at 601. The write request includes data, address, and a keyID. A determination of if the keyID is a TD keyID is made at 603. The cryptographic engine 136 may reference either or both of the KET 122 and the KOT 124 in order to determine whether a key ID located within the physical address of a memory operation is a TD key ID.

When the keyID is not a TD keyID, a corresponding TD-bit is set to zero at 607. When the keyID is a TD keyID, a corresponding TD-bit is set to 1 at 605.

With the TD-bit determined, a determination of if the TD-bit is in the internal metadata cache 118A is made at 609. For example, is there a TD-bit cacheline in the internal metadata cache 118A for the TD keyID? When the there is not a TD-bit cacheline in the internal metadata cache 118A, the TD-bit cacheline is fetched from memory (including associated MAC) and cached at 611.

An attempt to verity a MAC associated with the TD cacheline is made at 613. In some embodiments, the verification is performed by generating a MAC on the received TD-cacheline and if the generated MAC does not match the received MAC then verification fails. When the MAC does not verify correctly, a security exception is raised at 617. This exception can come in many forms, but in some embodiments is in the form of poisoning the read response to indicate the core that the data is bad.

If the MAC checks out correctly, or if the TD bit cacheline was already present in the metadata cache, the determined TD-bit value is used to update the TD cacheline in the metadata cache at 617. The data may also be encrypted and stored in memory at the address provided by the request.

Figure 7:
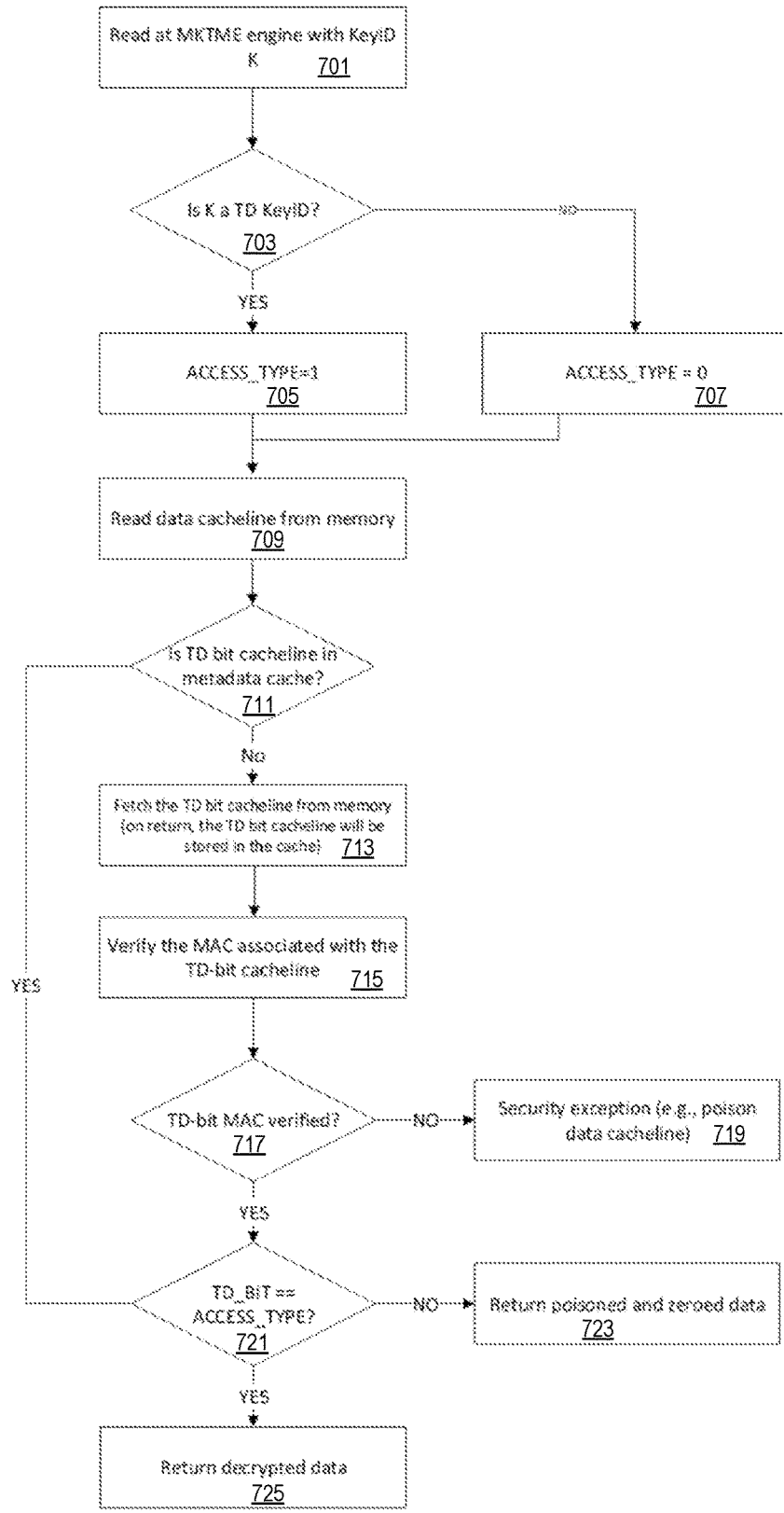
FIG. 7 illustrates embodiments of a method of handling a read request by a cryptographic engine.

FIG. 7 illustrates embodiments of a method of handling a read request by a cryptographic engine. A read request is received by the cryptographic engine 136 at 701. The read request includes an address and a keyID.

A determination of if the keyID is a TD keyID is made at 703.

When the keyID is not a TD keyID, the access type is set to not worry about using TD-bits at 707. When the keyID is a TD keyID, then the read needs to take into account TD-bit information and a corresponding access type is set at 705.

The cacheline is read from the provided memory address at 709.

A determination of if TD bit cacheline associated with the access type (e.g., TD-bit key) is present in the metadata cache is made at 711. Note this may be done in parallel with the memory read.

When the TD-bit is not in the cache, the TD-bit cacheline is fetched along with its MAC from memory at 713. An attempt to verity a MAC associated with the TD cacheline is made at 715. In some embodiments, the verification is performed by generating a MAC on the received TD-cacheline and if the generated MAC does not match the received MAC then verification fails. When the MAC does not verify correctly, a security exception is raised at 617. This exception can come in many forms, but in some embodiments is in the form of poisoning the read response to indicate the data is bad.

When the MAC verifies correctly, a determination of if the access type is to account for a TD-bit is made at 721. As in, does the TD-bit in the cache have the same value as what was computed earlier?

If there is no match, a poisoned indication is returned along with zeroed data at 723. When there is a match, the dataline read from memory is decrypted and returned to the requester.

Note that in the flows detailed above, there was no distinction made between the two metadata layouts detailed earlier. If TD-bit cacheline is not present in the metadata cache with disjoint metadata layout, an additional request will need to be sent to memory for the fetching and verifying the associated MAC. On an eviction from the metadata cache, a MAC will be computed on the evicted line (if modified) and stored in memory depending on the metadata layout chosen by the implementation. The embedded metadata layout will require just one access to memory whereas the disjoint metadata layout will require two memory accesses to store a TD-bit cacheline in memory securely.

The cryptographic protections are enabled and activated using one or more MSRs.

FIG. 8 illustrates embodiments of a model specific register (MSR) detailing memory encryption capability. In some embodiments, this register is ME_CAPABILITY. This illustration shows MSR bit fields 801 and their corresponding description 803. Note that fields may be rearranged, etc. as this is merely an exemplary MSR layout.

The table below illustrates an example of PCONFIG leaf encodings that could be used to enable support for multiple leaf functions. Although only one leaf function is shown (the KEY_PROGRAM leaf), additional leaf functions can be defined using the reserved leaf encodings in order to extend the functionality of the PCONFIG instruction such as supporting the above instructions.

| PCONFIG Leaf Function Encodings | | |
|---|---|---|
| LEAF | ENCODING | DESCRIPTION |
| KEY_PROGRAM | 0x00000000 | This leaf function is used to program the key associated with a domain. |
| OTHER | 0x00000001-0xFFFFFFFF | Additional leaf functions can be defined using these reserved leaf encodings for future extensions to the functionality of the PCONFIG instruction. |

The key program leaf function (KEY_PROGRAM) of the PCONFIG instruction can be used to program a key for a protected domain. In some embodiments, the parameters used by the key program leaf function may be specified in a key program structure (KEY_PROGRAM_STRUCT), and the address of the key program structure may be specified in a hardware register (e.g., the RBX register). The table below illustrates an example embodiment of the key program structure (KEY_PROGRAM_STRUCT).

| Key Program Structure (KEY_PROGRAM_STRUCT) | | |
|---|---|---|
| FIELD | SIZE (bytes) | DESCRIPTION |
| KEYID | 1 | This field identifies the KeyID of a domain that is being programmed. |
| KEYID_CMD | 1 | This field identifies a key programming command. |
| KEYID_ENC_ALG | 2 | This field may be used to select an encryption algorithm to use for the domain (based on the available encryption algorithms). |
| KEYID_KEY | 16 | This field may identify an encryption key for the domain. |
| KEYID_TWEAK_KEY | 16 | This field may identify a tweak key value. |

The first five fields indicate what encryption and MAC are to be used. Bit 4 indicates using integrity protected access control.

Bits 63:32 identify the keyIDs to use.

In some embodiments, the PCONFIG instruction may support various leaf functions for configuring and managing protected domains. When the PCONFIG instruction is executed, for example, the particular leaf function to invoke may be specified in a hardware register (e.g., the EAX register). In some embodiments, the parameters used by a particular leaf function may also be specified in hardware registers (e.g., the RBX/RCX/RDX registers).

As shown in the table above, the key program structure identifies the KeyID of the particular domain being programmed, and it also specifies a key programming command. In some embodiments, for example, the key program leaf function may support multiple key programming commands, and the desired command may be specified in the key program structure. Moreover, in some embodiments, the key program structure may also include reserved field(s) that can be used for subsequent extensions to the key program leaf function.

The table below illustrates examples of key programming commands that may be supported by the key program leaf function.

| Key Programming Commands | | |
|---|---|---|
| KEY DOMAIN (KD) COMMAND | ENCODING | DESCRIPTION |
| Set Key Direct (KD_SET_KEY_DIRECT) | 0 | This command sets the key for a domain directly using the key specified in the key program structure (KEY_PROGRAM_STRUCT). The key is provided by the software that initiates this key programming command. The domain is then protected in custom encryption mode. |
| Set Key Random (KD_SET_KEY_RANDOM) | 1 | This command sets the key for a domain using a randomly generated key. For example, a key may be randomly generated by a processor and/or a random number generator, and thus may not be known by (or shared with) the software that initiates the key programming command. The domain is then protected in custom encryption mode. |
| Clear Key (KD_CLEAR_KEY) | 2 | This command clears the key that was previously set for a domain. The domain is then protected in default encryption mode. |
| No Key (KD_NO_KEY) | 3 | This command disables memory encryption for a domain. The domain is then protected in plaintext mode. |

After the key program leaf function is executed, a return value or status code may be specified in a hardware register to indicate whether the key program function was successful. The table below illustrates examples of the status codes that may be returned by the key program leaf function.

| Status codes returned by key program leaf function (KEY_PROGRAM) | | |
|---|---|---|
| STATUS CODE | ENCODING | DESCRIPTION |
| PROG_SUCCESS | 0 | The domain is programmed successfully. |
| INVALID_PROG_CMD | 1 | The key programming command is invalid. |
| ENTROPY_ERROR | 2 | The entropy of a randomly generated key is insufficient. |
| INVALID_KEYID | 3 | The domain key ID is invalid. |
| INVALID_ENC_ALG | 4 | An invalid encryption algorithm is selected. |
| DEVICE_BUSY | 5 | A lock for the domain key table cannot be obtained. |

While the illustrated embodiment uses the PCONFIG processor instruction to perform domain configuration, other embodiments may use alternative and/or additional approaches for domain configuration. For example, in some embodiments, domain configuration may be performed using hardware registers. For example, a PCONFIG model-specific register (MSR) may be implemented for performing domain configuration, allowing software to invoke the PCONFIG operation by writing to the PCONFIG MSR (e.g., executing a WRMSR instruction with the index for the PCONFIG MSR passed in a register, such as the ECX register). Moreover, certain parameters for the PCONFIG operation (and its associated leaf functions and commands) may be passed in hardware registers. For example, the address of the key program structure (KEY_PROGRAM_STRUCT) can be passed in a hardware register, such as the EDX register, EAX register, or both of those registers (e.g., for 64-bit memory addresses). The PCONFIG operation can then be performed in a similar manner as described above.

Moreover, in some embodiments, a PCONFIG operation may utilize wrapped blobs for domain key programming. In this manner, domain keys can be programmed without revealing the keys to management software. In some embodiments, for example, additional PCONFIG leaf functions may be implemented to enable keys to be wrapped and then subsequently programmed to memory security engine 'INVB05 after being unwrapped.

Example pseudocode for implementing the PCONFIG instruction is provided below:

```
// #UD (undefined opcode exception) if PCONFIG is not enumerated or in VM86, or CPL>0
if (CPUID.7.0:ECX[PCONFIG] == 0 OR RFLAGS.VM == 1 OR CPL > 0) #UD;
if (in VMX non-root mode)
{
  if (VMCS.PCONFIG)
  {
  if ((EAX > 62 AND VMCS.PCONFIG_EXITING[63] ==1) OR
    (EAX < 63 AND VMCS.PCONFIG_EXITING[EAX] == 1))
  {
  Set VMCS.EXIT_REASON = PCONFIG; //No Exit qualification
  Deliver VMEXIT;
  }
    }
  else
  {
  #UD
  }
}
// #GP(0) (general protection fault) for an unsupported leaf
if(EAX != 0) #GP(0)
// KEY_PROGRAM leaf flow
if (EAX == 0)
{
//#GP(0) if ME_ACTIVATE_MSR is not locked or does not enable memory encryption (ME) or
multiple keys are not enabled
if (ME_ACTIVATE_MSR.LOCK != 1 OR ME_ACTIVATE_MSR.ENABLE != 1 OR
ME_ACTIVATE_MSR.ME_KEYID_BITS == 0) #GP(0)
  // Check KEY_PROGRAM_STRUCT is 256B aligned
  if(DS:RBX is not 256B aligned) #GP(0);
  // Check that KEY_PROGRAM_STRUCT is read accessible
  <<DS: RBX should be read accessible>>
  // Copy KEY_PROGRAM_STRUCT to a temporary variable
  TMP_KEY_PROGRAM_STRUCT = DS:RBX.*;
  // RSVD field check
  if(TMP_KEY_PROGRAM_STRUCT.RSVD != 0) #GP(0);
  if(TMP_KEY_PROGRAM_STRUCT.USUPP_KEYID_KEY.BYTES[63:16] != 0) #GP(0);
    if(TMP_KEY_PROGRAM_STRUCT.USUPP_KEYID_TWEAK_KEY.BYTES[63:16] != 0)
#GP(0);
// Check for a valid command
if(TMP_KEY_PROGRAM_STRUCT. KEYID_CMD.COMMAND is not a valid command)
{
  RFLAGS.ZF = 1;
  RAX = INVALID_PROG_CMD;
    goto EXIT;
}
// Check that the KEYID being operated upon is a valid KEYID
if(TMP_KEY_PROGRAM_STRUCT.KEYID >
2^ME_ACTIVATE_MSR.ME_KEYID_BITS - 1
OR TMP_KEY_PROGRAM_STRUCT.KEYID >
ME_CAPABILITY_MSR.ME_MAX_KEYS
OR TMP_KEY_PROGRAM_STRUCT.KEYID == 0)
{
RFLAGS.ZF = 1;
    RAX = INVALID_KEYID;
    goto EXIT;
}
// Check that only one algorithm is requested for the KEYID domain and it is one of the activated
algorithms
if(NUM_BITS(TMP_KEY_PROGRAM_STRUCT.KEYID_CMD.ENC_ALG) != 1 | |
(TMP_KEY_PROGRAM_STRUCT.KEYID_CMD.ENC_ALG &
ME_ACTIVATE_MSR.ME_ALG_ENABLE ==0))
{
RFLAGS.ZF = 1;
    RAX = INVALID_ENC_ALG;
    goto EXIT;
}
// Try to acquire exclusive lock
if (NOT KEY_TABLE_LOCK.ACQUIRE(WRITE))
{
  // PCONFIG failure
  RFLAGS.ZF = 1;
  RAX = DEVICE_BUSY;
    goto EXIT;
}
// Lock is acquired
switch(TMP_KEY_PROGRAM_STRUCT.KEYID_CMD.COMMAND)
{
case KD_SET_KEY_DIRECT:
```

```
    <<Write
KEY=TMP_KEY_PROGRAM_STRUCT.USUPP_KEYID_KEY,
TWEAK_KEY=TMP_KEY_PROGRAM_STRUCT.USUPP_KEYID_TWEAK_KEY,
KEY_CONTROL=2'b01,
to ME Key table at index TMP_KEY_PROGRAM_STRUCT.KEYID
>>
// Do a read to guarantee completion of previous writes
<<Read KEY_CONTROL bits at index TMP_KEY_PROGRAM_STRUCT.KEYID>>
    break;
case KD_SET_KEY_RANDOM:
TMP_RND_KEY = <<Generate a random key using RDSEED>>
    if (NOT ENOUGH ENTROPY)
    {
RFLAGS.ZF = 1;
        RAX = ENTROPY_ERROR;
        goto EXIT;
}
TMP_RND_TWEAK_KEY = <<Generate a random key using RDSEED>>
    if (NOT ENOUGH ENTROPY)
    {
RFLAGS.ZF = 1;
        RAX = ENTROPY_ERROR;
        goto EXIT;
}
// Mix user supplied entropy to the data key and tweak key
TMP_RND_KEY = TMP_RND_KEY XOR
TMP_KEY_PROGRAM_STRUCT.USUPP_KEYID_KEY.BYTES[15:0];
TMP_RND_TWEAK_KEY = TMP_RND_TWEAK_KEY XOR
TMP_KEY_PROGRAM_STRUCT.USUPP_KEYID_TWEAK_KEY.BYTES[15:0];
<<Write
KEY=TMP_RND_KEY,
TWEAK_KEY=TMP_RND_TWEAK_KEY,
KEY_CONTROL=2'b01,
to ME_KEY_TABLE at index TMP_KEY_PROGRAM_STRUCT.KEYID
>>
// Do a read to guarantee completion of previous writes
<<Read KEY_CONTROL bits at index TMP_KEY_PROGRAM_STRUCT.KEYID>>
    break;
case KD_CLEAR_KEY:
    <<Write
KEY='0,
    TWEAK_KEY='0,
KEY_CONTROL = 2'b00,
to ME_KEY_TABLE at index TMP_KEY_PROGRAM_STRUCT.KEYID
>>
// Do a read to guarantee completion of previous writes
<<Read KEY_CONTROL bits at index TMP_KEY_PROGRAM_STRUCT.KEYID>>
    break;
case KD_NO_KEY:
    <<Write
KEY_CONTROL=2'b11,
to ME Key table at index TMP_KEY_PROGRAM_STRUCT.KEYID
>>
// Do a read to guarantee completion of previous writes
<<Read KEY_CONTROL bits at index TMP_KEY_PROGRAM_STRUCT.KEYID>>
    break;
}
RAX = 0;
RFLAGS.ZF = 0;
// Release Lock
KEY_TABLE_LOCK(RELEASE);
EXIT:
RFLAGS.CF=0;
RFLAGS.PF=0;
RFLAGS.AF=0;
RFLAGS.OF=0;
RFLAGS.SF=0;
}
```

FIG. 9 illustrates embodiments of a model specific register (MSR) detailing memory activation. In some embodiments, this register is ME_ACTIVATE which is used, at least in part, to lock MSRs. This illustration shows MSR bit fields 901 and their corresponding description 903. Note that fields may be rearranged, etc. as this is merely an exemplary MSR layout.

Bit 0 indicates a read-only lock on MSE MSRs after memory encryption has been activated. For example, the lock may be activated after memory encryption has been activated through a write to the ACTIVATE_MSR register (e.g., using a write MSR or WRMSR instruction). The lock can be enabled by setting this bit field to 1, and the lock can be disabled by setting this bit field to 0.

Bit 1, when set, enables memory encryption (which may be total memory encryption). Bit 2 is used to select a key for a default mode. Either create a new key at boot (when 0) or restore a key (when 1).

Bit 3 indicates to save the key into storage when resuming from standby.

Bits 7:4 indicate the encryption algorithm that is to be used. The value aligns with the first five fields of the MSR of FIG. 8.

Bits 35:32 indicate the number of keys to support. For example, if this has a value of 8 then up to 256 keys would be supported.

Bits 47:36 are reserved.

Bits 63:48 acts as a bitmask for each KEYID of if the KEYID has a valid encryption algorithm specified.

Embodiments of the above discussed aspects may be utilized in a variety of architectures, systems, cores, etc.

Exemplary Computer Architectures

Detailed below are describes of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, handheld devices, and various other electronic devices, are also suitable. In general, a huge variety of systems or electronic devices capable of incorporating a processor and/or other execution logic as disclosed herein are generally suitable.

Figure 10:
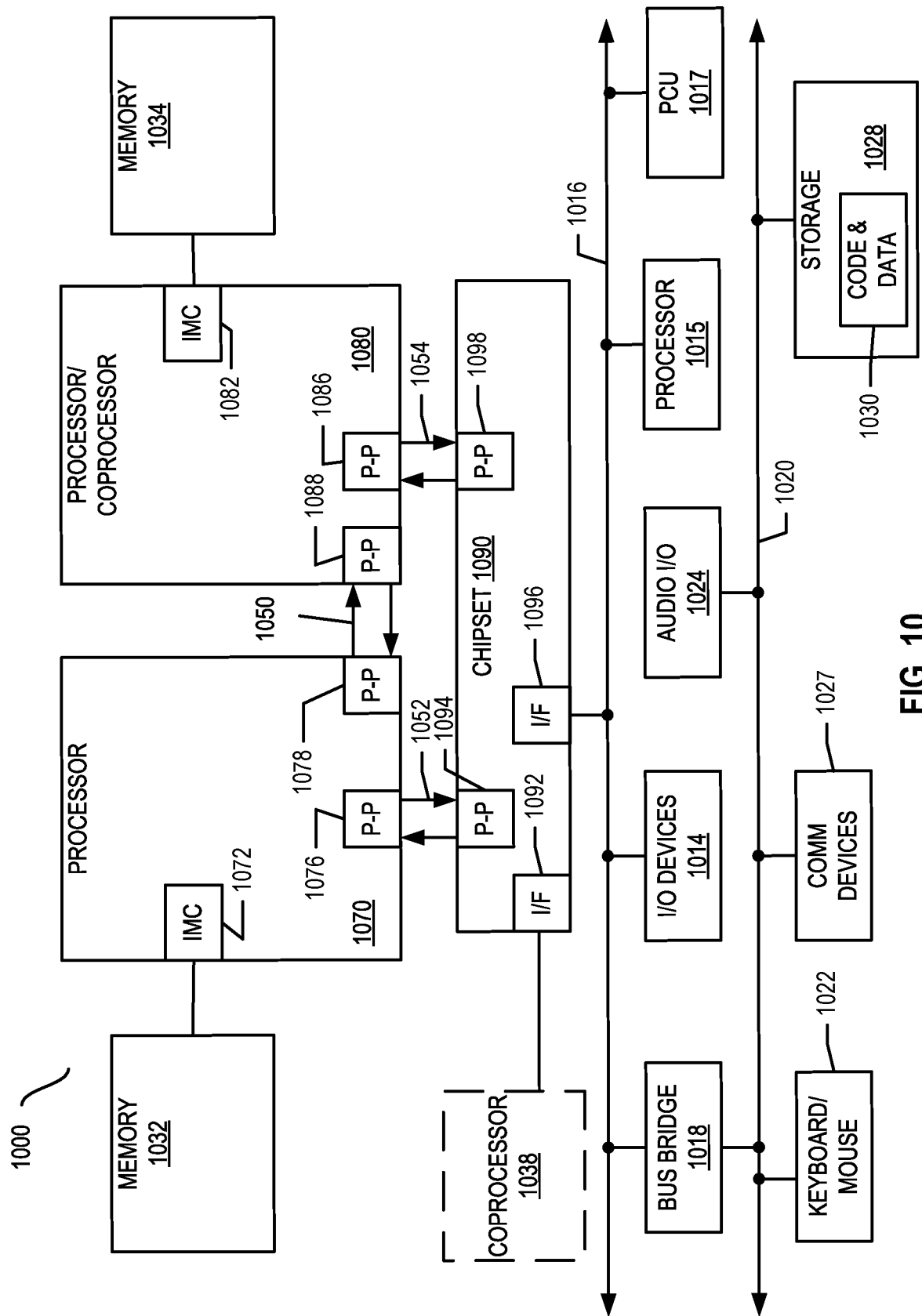
FIG. 10 illustrates embodiments of an exemplary system.

FIG. 10 illustrates embodiments of an exemplary system. Multiprocessor system 1000 is a point-to-point interconnect system and includes a plurality of processors including a first processor 1070 and a second processor 1080 coupled via a point-to-point interconnect 1050. In some embodiments, the first processor 1070 and the second processor 1080 are homogeneous. In some embodiments, first processor 1070 and the second processor 1080 are heterogenous.

Processors 1070 and 1080 are shown including integrated memory controller (IMC) units circuitry 1072 and 1082, respectively. Processor 1070 also includes as part of its interconnect controller units point-to-point (P-P) interfaces 1076 and 1078; similarly, second processor 1080 includes P-P interfaces 1086 and 1088. Processors 1070, 1080 may exchange information via the point-to-point (P-P) interconnect 1050 using P-P interface circuits 1078, 1088. IMCs 1072 and 1082 couple the processors 1070, 1080 to respective memories, namely a memory 1032 and a memory 1034, which may be portions of main memory locally attached to the respective processors.

Processors 1070, 1080 may each exchange information with a chipset 1090 via individual P-P interconnects 1052, 1054 using point to point interface circuits 1076, 1094, 1086, 1098. Chipset 1090 may optionally exchange information with a coprocessor 1038 via a high-performance interface 1092. In some embodiments, the coprocessor 1038 is a special-purpose processor, such as, for example, a high-throughput MIC processor, a network or communication processor, compression engine, graphics processor, GPGPU, embedded processor, or the like.

A shared cache (not shown) may be included in either processor 1070, 1080 or outside of both processors, yet connected with the processors via P-P interconnect, such that either or both processors' local cache information may be stored in the shared cache if a processor is placed into a low power mode.

Chipset 1090 may be coupled to a first interconnect 1016 via an interface 1096. In some embodiments, first interconnect 1016 may be a Peripheral Component Interconnect (PCI) interconnect, or an interconnect such as a PCI Express interconnect or another I/O interconnect. In some embodiments, one of the interconnects couples to a power control unit (PCU) 1017, which may include circuitry, software, and/or firmware to perform power management operations with regard to the processors 1070, 1080 and/or co-processor 1038. PCU 1017 provides control information to a voltage regulator to cause the voltage regulator to generate the appropriate regulated voltage. PCU 1017 also provides control information to control the operating voltage generated. In various embodiments, PCU 1017 may include a variety of power management logic units (circuitry) to perform hardware-based power management. Such power management may be wholly processor controlled (e.g., by various processor hardware, and which may be triggered by workload and/or power, thermal or other processor constraints) and/or the power management may be performed responsive to external sources (such as a platform or power management source or system software).

PCU 1017 is illustrated as being present as logic separate from the processor 1070 and/or processor 1080. In other cases, PCU 1017 may execute on a given one or more of cores (not shown) of processor 1070 or 1080. In some cases, PCU 1017 may be implemented as a microcontroller (dedicated or general-purpose) or other control logic conFIG.d to execute its own dedicated power management code, sometimes referred to as P-code. In yet other embodiments, power management operations to be performed by PCU 1017 may be implemented externally to a processor, such as by way of a separate power management integrated circuit (PMIC) or another component external to the processor. In yet other embodiments, power management operations to be performed by PCU 1017 may be implemented within BIOS or other system software.

Various I/O devices 1014 may be coupled to first interconnect 1016, along with an interconnect (bus) bridge 1018 which couples first interconnect 1016 to a second interconnect 1020. In some embodiments, one or more additional processor(s) 1015, such as coprocessors, high-throughput MIC processors, GPGPU's, accelerators (such as, e.g., graphics accelerators or digital signal processing (DSP) units), field programmable gate arrays (FPGAs), or any other processor, are coupled to first interconnect 1016. In some embodiments, second interconnect 1020 may be a low pin count (LPC) interconnect. Various devices may be coupled to second interconnect 1020 including, for example, a keyboard and/or mouse 1022, communication devices 1027 and a storage unit circuitry 1028. Storage unit circuitry 1028 may be a disk drive or other mass storage device which may include instructions/code and data 1030, in some embodiments. Further, an audio I/O 1024 may be coupled to second interconnect 1020. Note that other architectures than the point-to-point architecture described above are possible. For example, instead of the point-to-point architecture, a system such as multiprocessor system 1000 may implement a multi-drop interconnect or other such architecture.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die as the described CPU (sometimes referred to as the application core(s) or application processor(s)), the above described coprocessor, and additional functionality. Exemplary core architectures are described next, followed by descriptions of exemplary processors and computer architectures.

Figure 11:
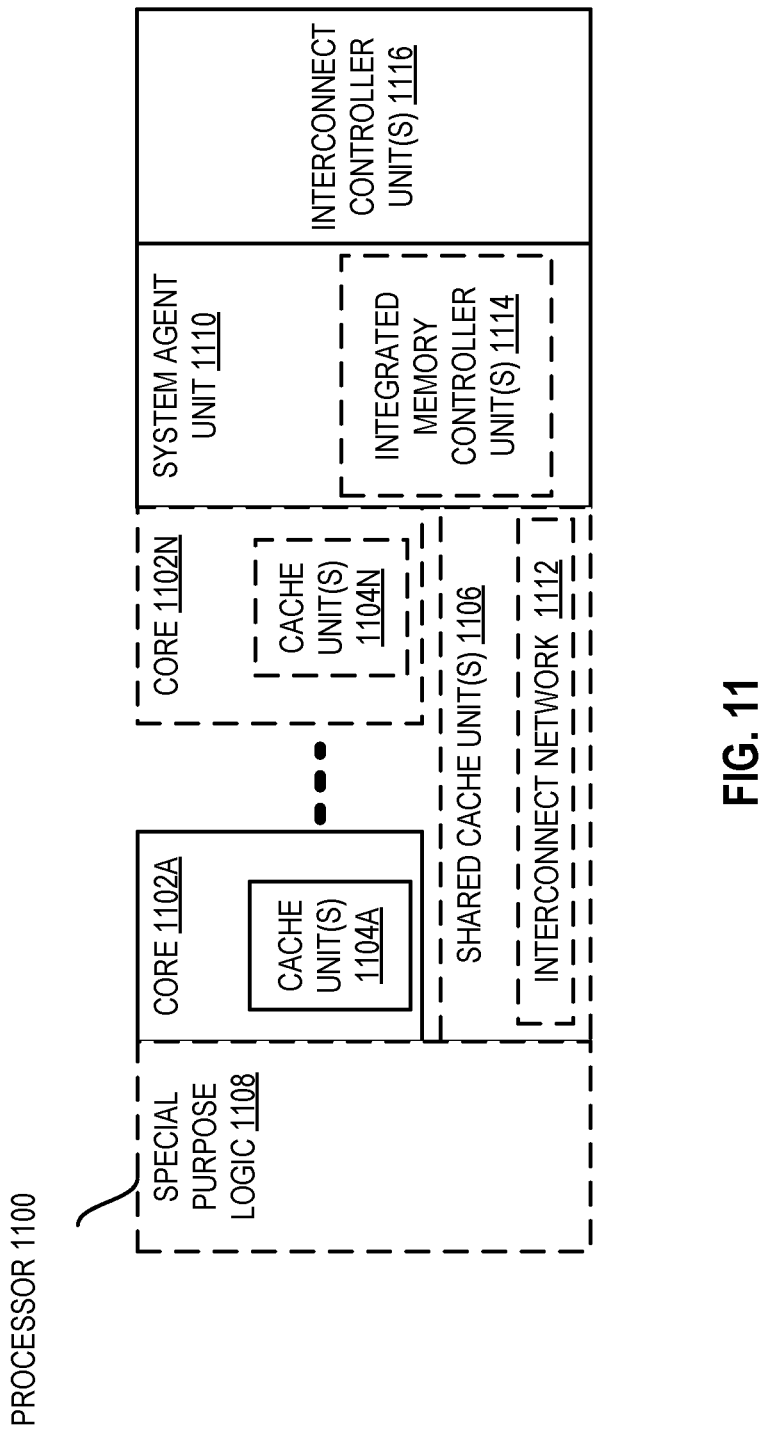
FIG. 11 illustrates a block diagram of embodiments of a processor that may have more than one core, may have an integrated memory controller, and may have integrated graphics.

FIG. 11 illustrates a block diagram of embodiments of a processor 1100 that may have more than one core, may have an integrated memory controller, and may have integrated graphics. The solid lined boxes illustrate a processor 1100 with a single core 1102A, a system agent 1110, a set of one or more interconnect controller units circuitry 1116, while the optional addition of the dashed lined boxes illustrates an alternative processor 1100 with multiple cores 1102(A)-(N), a set of one or more integrated memory controller unit(s) circuitry 1114 in the system agent unit circuitry 1110, and special purpose logic 1108, as well as a set of one or more interconnect controller units circuitry 1116. Note that the processor 1100 may be one of the processors 1070 or 1080, or co-processor 1038 or 1015 of FIG. 10.

Thus, different implementations of the processor 1100 may include: 1) a CPU with the special purpose logic 1108 being integrated graphics and/or scientific (throughput) logic (which may include one or more cores, not shown), and the cores 1102(A)-(N) being one or more general purpose cores (e.g., general purpose in-order cores, general purpose out-of-order cores, or a combination of the two); 2) a coprocessor with the cores 1102(A)-(N) being a large number of special purpose cores intended primarily for graphics and/or scientific (throughput); and 3) a coprocessor with the cores 1102(A)-(N) being a large number of general purpose in-order cores. Thus, the processor 1100 may be a general-purpose processor, coprocessor or special-purpose processor, such as, for example, a network or communication processor, compression engine, graphics processor, GPGPU (general purpose graphics processing unit circuitry), a high-throughput many integrated core (MIC) coprocessor (including 30 or more cores), embedded processor, or the like. The processor may be implemented on one or more chips. The processor 1100 may be a part of and/or may be implemented on one or more substrates using any of a number of process technologies, such as, for example, BiCMOS, CMOS, or NMOS.

A memory hierarchy includes one or more levels of cache unit(s) circuitry 1104(A)-(N) within the cores 1102(A)-(N), a set of one or more shared cache units circuitry 1106, and external memory (not shown) coupled to the set of integrated memory controller units circuitry 1114. The set of one or more shared cache units circuitry 1106 may include one or more mid-level caches, such as level 2 (L2), level 3 (L3), level 4 (L4), or other levels of cache, such as a last level cache (LLC), and/or combinations thereof. While in some embodiments ring-based interconnect network circuitry 1112 interconnects the special purpose logic 1108 (e.g., integrated graphics logic), the set of shared cache units circuitry 1106, and the system agent unit circuitry 1110, alternative embodiments use any number of well-known techniques for interconnecting such units. In some embodiments, coherency is maintained between one or more of the shared cache units circuitry 1106 and cores 1102(A)-(N).

In some embodiments, one or more of the cores 1102(A)-(N) are capable of multi-threading. The system agent unit circuitry 1110 includes those components coordinating and operating cores 1102(A)-(N). The system agent unit circuitry 1110 may include, for example, power control unit (PCU) circuitry and/or display unit circuitry (not shown). The PCU may be or may include logic and components needed for regulating the power state of the cores 1102(A)-(N) and/or the special purpose logic 1108 (e.g., integrated graphics logic). The display unit circuitry is for driving one or more externally connected displays.

The cores 1102(A)-(N) may be homogenous or heterogeneous in terms of architecture instruction set; that is, two or more of the cores 1102(A)-(N) may be capable of executing the same instruction set, while other cores may be capable of executing only a subset of that instruction set or a different instruction set.

Exemplary Core Architectures

In-Order and Out-of-Order Core Block Diagram

Figure 12A:
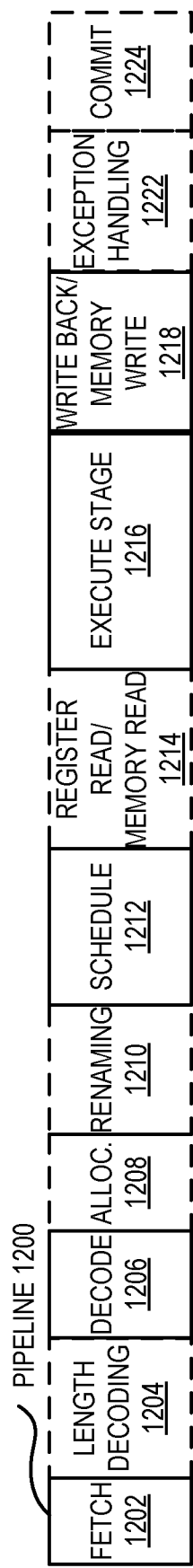
FIG. 12(A) is a block diagram illustrating both an exemplary in-order pipeline and an exemplary register renaming, out-of-order issue/execution pipeline according to embodiments.
Figure 12B:
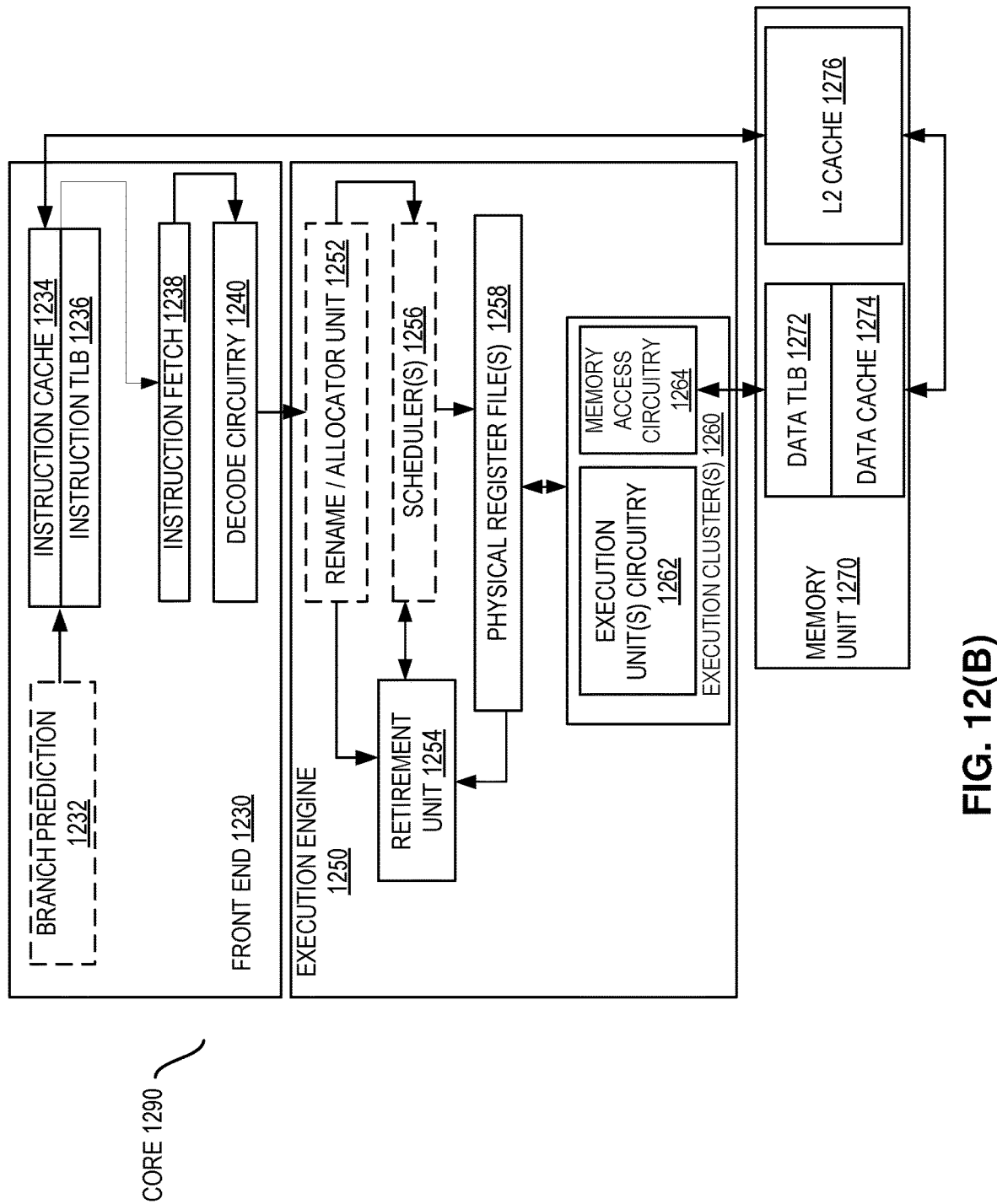
FIG. 12(B) is a block diagram illustrating both an exemplary embodiment of an in-order architecture core and an exemplary register renaming, out-of-order issue/execution architecture core to be included in a processor according to embodiments.

FIG. 12(A) is a block diagram illustrating both an exemplary in-order pipeline and an exemplary register renaming, out-of-order issue/execution pipeline according to embodiments of the invention. FIG. 12(B) is a block diagram illustrating both an exemplary embodiment of an in-order architecture core and an exemplary register renaming, out-of-order issue/execution architecture core to be included in a processor according to embodiments of the invention. The solid lined boxes in FIGS. 12(A)-(B) illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 12(A), a processor pipeline 1200 includes a fetch stage 1202, an optional length decode stage 1204, a decode stage 1206, an optional allocation stage 1208, an optional renaming stage 1210, a scheduling (also known as a dispatch or issue) stage 1212, an optional register read/memory read stage 1214, an execute stage 1216, a write back/memory write stage 1218, an optional exception handling stage 1222, and an optional commit stage 1224. One or more operations can be performed in each of these processor pipeline stages. For example, during the fetch stage 1202, one or more instructions are fetched from instruction memory, during the decode stage 1206, the one or more fetched instructions may be decoded, addresses (e.g., load store unit (LSU) addresses) using forwarded register ports may be generated, and branch forwarding (e.g., immediate offset or an link register (LR)) may be performed. In one embodiment, the decode stage 1206 and the register read/memory read stage 1214 may be combined into one pipeline stage. In one embodiment, during the execute stage 1216, the decoded instructions may be executed, LSU address/data pipelining to an Advanced Microcontroller Bus (AHB) interface may be performed, multiply and add operations may be performed, arithmetic operations with branch results may be performed, etc.

By way of example, the exemplary register renaming, out-of-order issue/execution core architecture may implement the pipeline 1200 as follows: 1) the instruction fetch 1238 performs the fetch and length decoding stages 1202 and 1204; 2) the decode unit circuitry 1240 performs the decode stage 1206; 3) the rename/allocator unit circuitry 1252 performs the allocation stage 1208 and renaming stage 1210; 4) the scheduler unit(s) circuitry 1256 performs the schedule stage 1212; 5) the physical register file(s) unit(s) circuitry 1258 and the memory unit circuitry 1270 perform the register read/memory read stage 1214; the execution cluster 1260 perform the execute stage 1216; 6) the memory unit circuitry 1270 and the physical register file(s) unit(s) circuitry 1258 perform the write back/memory write stage 1218; 7) various units (unit circuitry) may be involved in the exception handling stage 1222; and 8) the retirement unit circuitry 1254 and the physical register file(s) unit(s) circuitry 1258 perform the commit stage 1224.

FIG. 12(B) shows processor core 1290 including front-end unit circuitry 1230 coupled to an execution engine unit circuitry 1250, and both are coupled to a memory unit circuitry 1270. The core 1290 may be a reduced instruction set computing (RISC) core, a complex instruction set computing (CISC) core, a very long instruction word (VLIW) core, or a hybrid or alternative core type. As yet another option, the core 1290 may be a special-purpose core, such as, for example, a network or communication core, compression engine, coprocessor core, general purpose computing graphics processing unit (GPGPU) core, graphics core, or the like.

The front end unit circuitry 1230 may include branch prediction unit circuitry 1232 coupled to an instruction cache unit circuitry 1234, which is coupled to an instruction translation lookaside buffer (TLB) 1236, which is coupled to instruction fetch unit circuitry 1238, which is coupled to decode unit circuitry 1240. In one embodiment, the instruction cache unit circuitry 1234 is included in the memory unit circuitry 1270 rather than the front-end unit circuitry 1230. The decode unit circuitry 1240 (or decoder) may decode instructions, and generate as an output one or more micro-operations, micro-code entry points, microinstructions, other instructions, or other control signals, which are decoded from, or which otherwise reflect, or are derived from, the original instructions. The decode unit circuitry 1240 may further include an address generation unit circuitry (AGU, not shown). In one embodiment, the AGU generates an LSU address using forwarded register ports, and may further perform branch forwarding (e.g., immediate offset branch forwarding, LR register branch forwarding, etc.). The decode unit circuitry 1240 may be implemented using various different mechanisms. Examples of suitable mechanisms include, but are not limited to, look-up tables, hardware implementations, programmable logic arrays (PLAs), microcode read only memories (ROMs), etc. In one embodiment, the core 1290 includes a microcode ROM (not shown) or other medium that stores microcode for certain macroinstructions (e.g., in decode unit circuitry 1240 or otherwise within the front end unit circuitry 1230). In one embodiment, the decode unit circuitry 1240 includes a micro-operation (micro-op) or operation cache (not shown) to hold/cache decoded operations, micro-tags, or micro-operations generated during the decode or other stages of the processor pipeline 1200. The decode unit circuitry 1240 may be coupled to rename/allocator unit circuitry 1252 in the execution engine unit circuitry 1250.

The execution engine circuitry 1250 includes the rename/allocator unit circuitry 1252 coupled to a retirement unit circuitry 1254 and a set of one or more scheduler(s) circuitry 1256. The scheduler(s) circuitry 1256 represents any number of different schedulers, including reservations stations, central instruction window, etc. In some embodiments, the scheduler(s) circuitry 1256 can include arithmetic logic unit (ALU) scheduler/scheduling circuitry, ALU queues, arithmetic generation unit (AGU) scheduler/scheduling circuitry, AGU queues, etc. The scheduler(s) circuitry 1256 is coupled to the physical register file(s) circuitry 1258. Each of the physical register file(s) circuitry 1258 represents one or more physical register files, different ones of which store one or more different data types, such as scalar integer, scalar floating-point, packed integer, packed floating-point, vector integer, vector floating-point, status (e.g., an instruction pointer that is the address of the next instruction to be executed), etc. In one embodiment, the physical register file(s) unit circuitry 1258 includes vector registers unit circuitry, writemask registers unit circuitry, and scalar register unit circuitry. These register units may provide architectural vector registers, vector mask registers, general-purpose registers, etc. The physical register file(s) unit(s) circuitry 1258 is overlapped by the retirement unit circuitry 1254 (also known as a retire queue or a retirement queue) to illustrate various ways in which register renaming and out-of-order execution may be implemented (e.g., using a reorder buffer(s) (ROB(s)) and a retirement register file(s); using a future file(s), a history buffer(s), and a retirement register file(s); using a register maps and a pool of registers; etc.). The retirement unit circuitry 1254 and the physical register file(s) circuitry 1258 are coupled to the execution cluster(s) 1260. The execution cluster(s) 1260 includes a set of one or more execution units circuitry 1262 and a set of one or more memory access circuitry 1264. The execution units circuitry 1262 may perform various arithmetic, logic, floating-point or other types of operations (e.g., shifts, addition, subtraction, multiplication) and on various types of data (e.g., scalar floating-point, packed integer, packed floating-point, vector integer, vector floating-point). While some embodiments may include a number of execution units or execution unit circuitry dedicated to specific functions or sets of functions, other embodiments may include only one execution unit circuitry or multiple execution units/execution unit circuitry that all perform all functions. The scheduler(s) circuitry 1256, physical register file(s) unit(s) circuitry 1258, and execution cluster(s) 1260 are shown as being possibly plural because certain embodiments create separate pipelines for certain types of data/operations (e.g., a scalar integer pipeline, a scalar floating-point/packed integer/packed floating-point/vector integer/vector floating-point pipeline, and/or a memory access pipeline that each have their own scheduler circuitry, physical register file(s) unit circuitry, and/or execution cluster—and in the case of a separate memory access pipeline, certain embodiments are implemented in which only the execution cluster of this pipeline has the memory access unit(s) circuitry 1264). It should also be understood that where separate pipelines are used, one or more of these pipelines may be out-of-order issue/execution and the rest in-order.

In some embodiments, the execution engine unit circuitry 1250 may perform load store unit (LSU) address/data pipelining to an Advanced Microcontroller Bus (AHB) interface (not shown), and address phase and writeback, data phase load, store, and branches.

The set of memory access circuitry 1264 is coupled to the memory unit circuitry 1270, which includes data TLB unit circuitry 1272 coupled to a data cache circuitry 1274 coupled to a level 2 (L2) cache circuitry 1276. In one exemplary embodiment, the memory access units circuitry 1264 may include a load unit circuitry, a store address unit circuit, and a store data unit circuitry, each of which is coupled to the data TLB circuitry 1272 in the memory unit circuitry 1270. The instruction cache circuitry 1234 is further coupled to a level 2 (L2) cache unit circuitry 1276 in the memory unit circuitry 1270. In one embodiment, the instruction cache 1234 and the data cache 1274 are combined into a single instruction and data cache (not shown) in L2 cache unit circuitry 1276, a level 3 (L3) cache unit circuitry (not shown), and/or main memory. The L2 cache unit circuitry 1276 is coupled to one or more other levels of cache and eventually to a main memory.

The core 1290 may support one or more instructions sets (e.g., the x86 instruction set (with some extensions that have been added with newer versions); the MIPS instruction set; the ARM instruction set (with optional additional extensions such as NEON)), including the instruction(s) described herein. In one embodiment, the core 1290 includes logic to support a packed data instruction set extension (e.g., AVX1, AVX2), thereby allowing the operations used by many multimedia applications to be performed using packed data.

Exemplary Execution Unit(s) Circuitry

Figure 13:
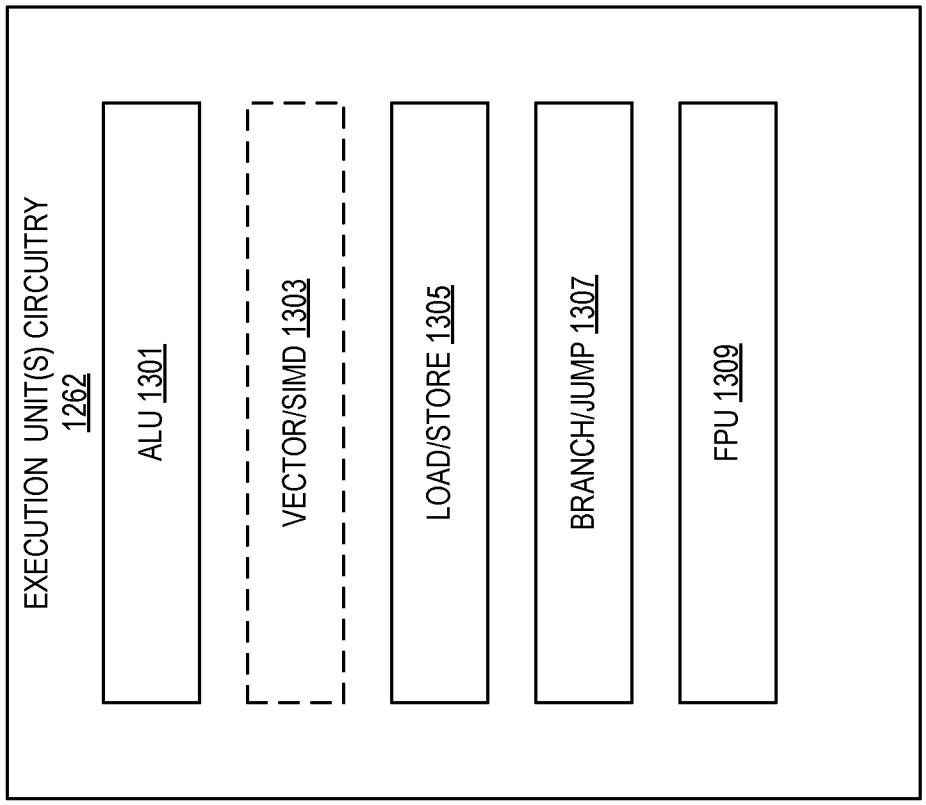
FIG. 13 illustrates embodiments of execution unit(s) circuitry.

FIG. 13 illustrates embodiments of execution unit(s) circuitry, such as execution unit(s) circuitry 1262 of FIG. 12(B). As illustrated, execution unit(s) circuitry 1262 may include one or more ALU circuits 1301, vector/SIMD unit circuits 1303, load/store unit circuits 1305, and/or branch/jump unit circuits 1307. ALU circuits 1301 perform integer arithmetic and/or Boolean operations. Vector/SIMD unit circuits 1303 perform vector/SIMD operations on packed data (such as SIMD/vector registers). Load/store unit circuits 1305 execute load and store instructions to load data from memory into registers or store from registers to memory. Load/store unit circuits 1305 may also generate addresses. Branch/jump unit circuits 1307 cause a branch or jump to a memory address depending on the instruction. Floating-point unit (FPU) circuits 1309 perform floating-point arithmetic. The width of the execution unit(s) circuitry 1262 varies depending upon the embodiment and can range from 16-bit to 1,024-bit. In some embodiments, two or more smaller execution units are logically combined to form a larger execution unit (e.g., two 128-bit execution units are logically combined to form a 256-bit execution unit).

Exemplary Register Architecture

Figure 14:
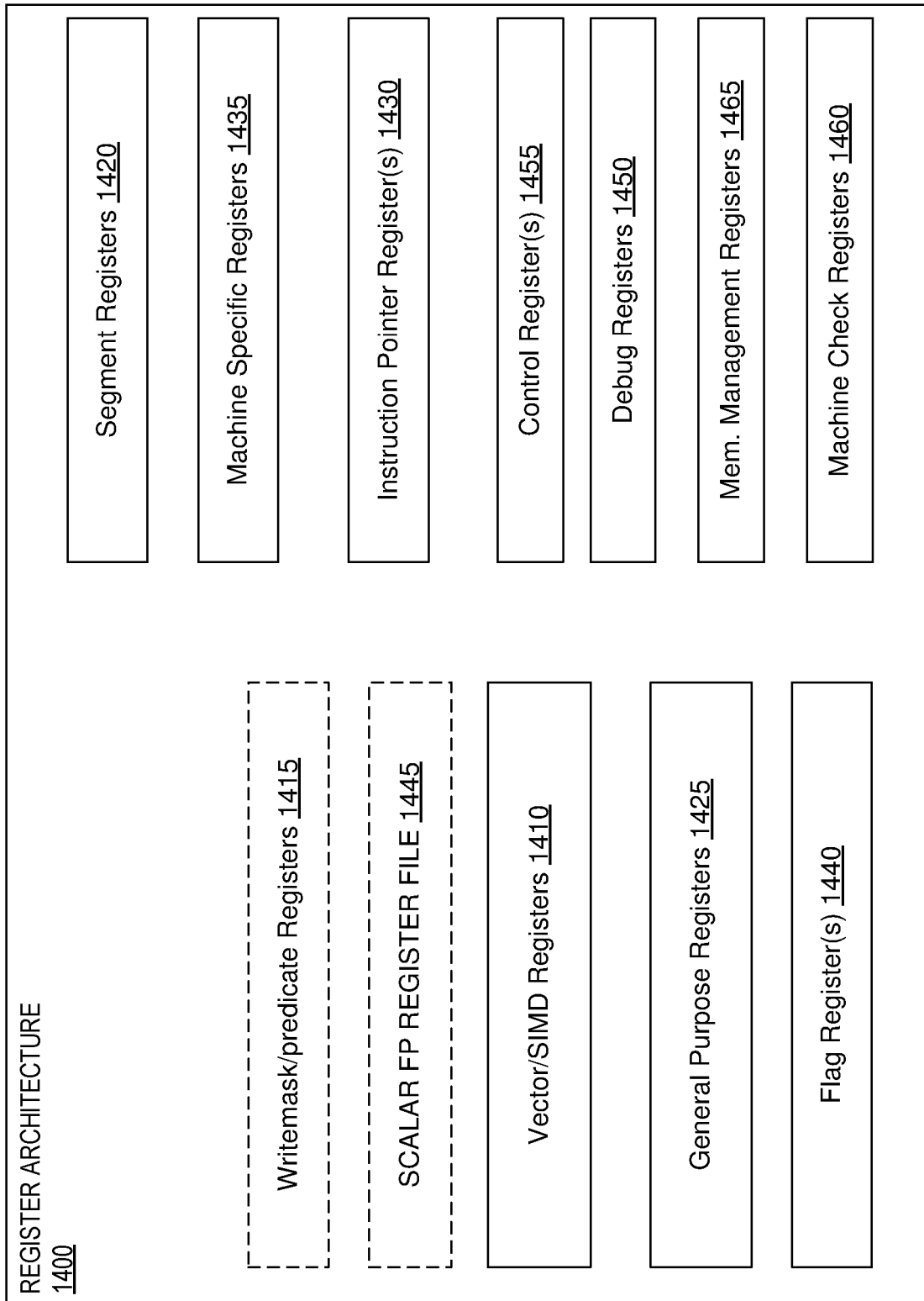
FIG. 14 is a block diagram of a register architecture according to some embodiments.

FIG. 14 is a block diagram of a register architecture 1400 according to some embodiments. As illustrated, there are vector/SIMD registers 1410 that vary from 128-bit to 1,024 bits width. In some embodiments, the vector/SIMD registers 1410 are physically 512-bits and, depending upon the mapping, only some of the lower bits are used. For example, in some embodiments, the vector/SIMD registers 1410 are ZMM registers which are 512 bits: the lower 256 bits are used for YMM registers and the lower 128 bits are used for XMM registers. As such, there is an overlay of registers. In some embodiments, a vector length field selects between a maximum length and one or more other shorter lengths, where each such shorter length is half the length of the preceding length. Scalar operations are operations performed on the lowest order data element position in a ZMM/YMM/XMM register; the higher order data element positions are either left the same as they were prior to the instruction or zeroed depending on the embodiment.

In some embodiments, the register architecture 1400 includes writemask/predicate registers 1415. For example, in some embodiments, there are 8 writemask/predicate registers (sometimes called k0 through k7) that are each 16-bit, 32-bit, 64-bit, or 128-bit in size. Writemask/predicate registers 1415 may allow for merging (e.g., allowing any set of elements in the destination to be protected from updates during the execution of any operation) and/or zeroing (e.g., zeroing vector masks allow any set of elements in the destination to be zeroed during the execution of any operation). In some embodiments, each data element position in a given writemask/predicate register 1415 corresponds to a data element position of the destination. In other embodiments, the writemask/predicate registers 1415 are scalable and consists of a set number of enable bits for a given vector element (e.g., 8 enable bits per 64-bit vector element).

The register architecture 1400 includes a plurality of general-purpose registers 1425. These registers may be 16-bit, 32-bit, 64-bit, etc. and can be used for scalar operations. In some embodiments, these registers are referenced by the names RAX, RBX, RCX, RDX, RBP, RSI, RDI, RSP, and R8 through R15.

In some embodiments, the register architecture 1400 includes scalar floating-point register 1445 which is used for scalar floating-point operations on 32/64/80-bit floating-point data using the x87 instruction set extension or as MMX registers to perform operations on 64-bit packed integer data, as well as to hold operands for some operations performed between the MMX and XMM registers.

One or more flag registers 1440 (e.g., EFLAGS, RFLAGS, etc.) store status and control information for arithmetic, compare, and system operations. For example, the one or more flag registers 1440 may store condition code information such as carry, parity, auxiliary carry, zero, sign, and overflow. In some embodiments, the one or more flag registers 1440 are called program status and control registers.

Segment registers 1420 contain segment points for use in accessing memory. In some embodiments, these registers are referenced by the names CS, DS, SS, ES, FS, and GS.

Machine specific registers (MSRs) 1435 control and report on processor performance. Most MSRs 1435 handle system-related functions and are not accessible to an application program. Machine check registers 1460 consist of control, status, and error reporting MSRs that are used to detect and report on hardware errors.

One or more instruction pointer register(s) 1430 store an instruction pointer value. Control register(s) 1455 (e.g., CR0-CR4) determine the operating mode of a processor (e.g., processor 1070, 1080, 1038, 1015, and/or 1100) and the characteristics of a currently executing task. Debug registers 1450 control and allow for the monitoring of a processor or core's debugging operations.

Memory management registers 1465 specify the locations of data structures used in protected mode memory management. These registers may include a GDTR, IDRT, task register, and a LDTR register.

Alternative embodiments of the invention may use wider or narrower registers. Additionally, alternative embodiments of the invention may use more, less, or different register files and registers.

Instruction Sets

An instruction set architecture (ISA) may include one or more instruction formats. A given instruction format may define various fields (e.g., number of bits, location of bits) to specify, among other things, the operation to be performed (e.g., opcode) and the operand(s) on which that operation is to be performed and/or other data field(s) (e.g., mask). Some instruction formats are further broken down though the definition of instruction templates (or sub-formats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands.

Exemplary Instruction Formats

Embodiments of the instruction(s) described herein may be embodied in different formats. Additionally, exemplary systems, architectures, and pipelines are detailed below. Embodiments of the instruction(s) may be executed on such systems, architectures, and pipelines, but are not limited to those detailed.

Figure 15:
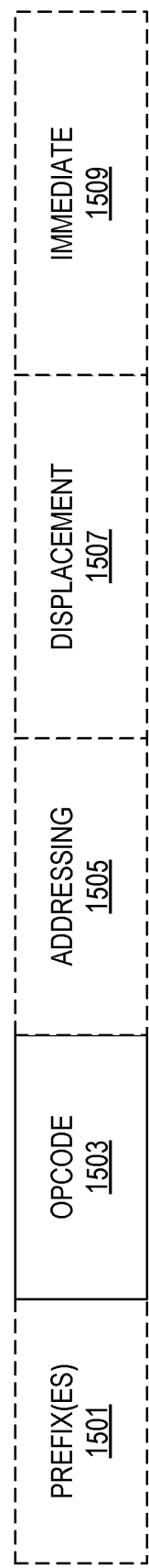
FIG. 15 illustrates embodiments of an instruction format.

FIG. 15 illustrates embodiments of an instruction format. As illustrated, an instruction may include multiple components including, but not limited to, one or more fields for: one or more prefixes 1501, an opcode 1503, addressing information 1505 (e.g., register identifiers, memory addressing information, etc.), a displacement value 1507, and/or an immediate 1509. Note that some instructions utilize some or all of the fields of the format whereas others may only use the field for the opcode 1503. In some embodiments, the order illustrated is the order in which these fields are to be encoded, however, it should be appreciated that in other embodiments these fields may be encoded in a different order, combined, etc.

The prefix(es) field(s) 1501, when used, modifies an instruction. In some embodiments, one or more prefixes are used to repeat string instructions (e.g., 0xF0, 0xF2, 0xF3, etc.), to provide section overrides (e.g., 0x2E, 0x36, 0x3E, 0x26, 0x64, 0x65, 0x2E, 0x3E, etc.), to perform bus lock operations, and/or to change operand (e.g., 0x66) and address sizes (e.g., 0x67). Certain instructions require a mandatory prefix (e.g., 0x66, 0xF2, 0xF3, etc.). Certain of these prefixes may be considered "legacy" prefixes. Other prefixes, one or more examples of which are detailed herein, indicate, and/or provide further capability, such as specifying particular registers, etc. The other prefixes typically follow the "legacy" prefixes.

The opcode field 1503 is used to at least partially define the operation to be performed upon a decoding of the instruction. In some embodiments, a primary opcode encoded in the opcode field 1503 is 1, 2, or 3 bytes in length. In other embodiments, a primary opcode can be a different length. An additional 3-bit opcode field is sometimes encoded in another field.

Figure 16:
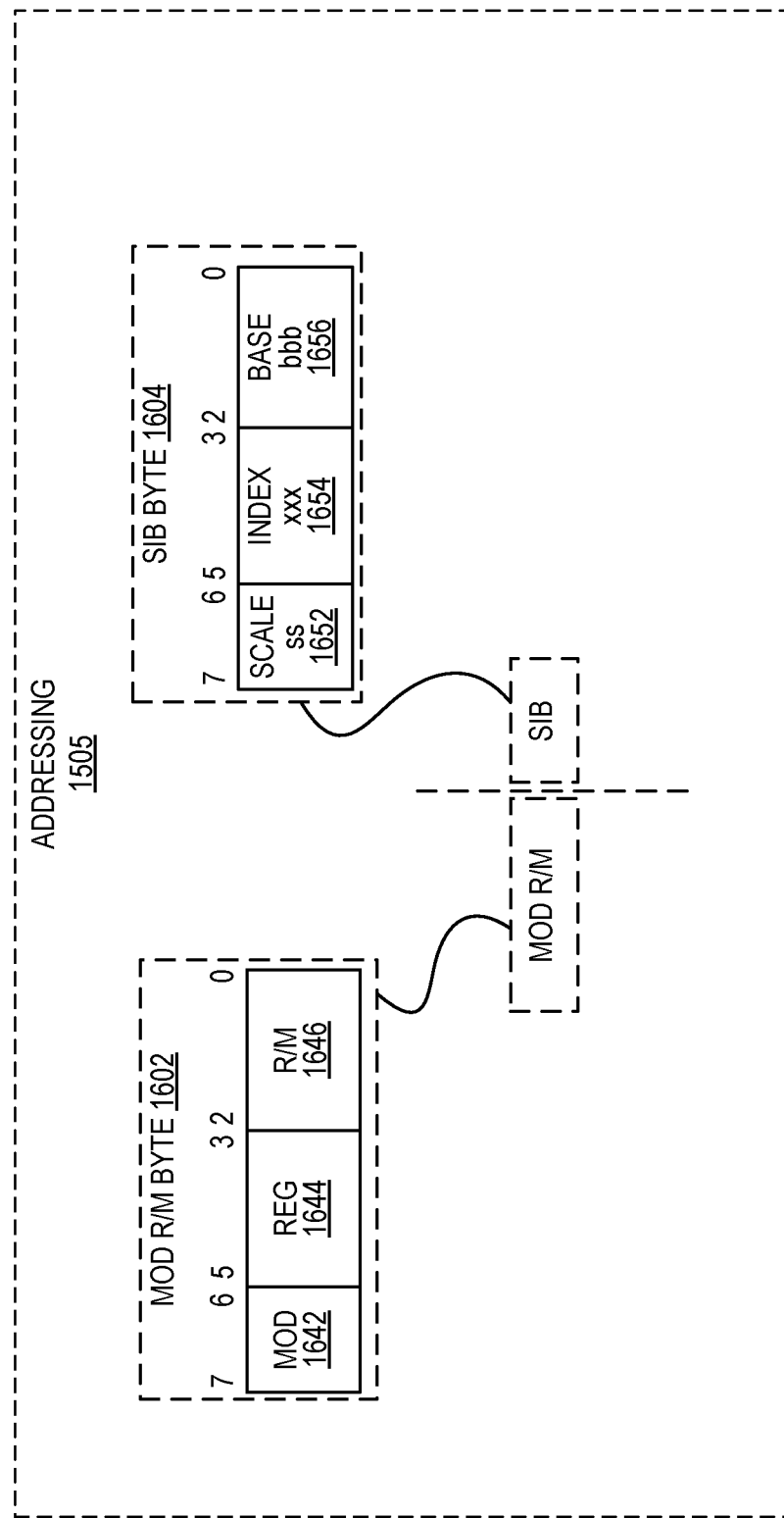
FIG. 16 illustrates embodiments of the addressing field.

The addressing field 1505 is used to address one or more operands of the instruction, such as a location in memory or one or more registers. FIG. 16 illustrates embodiments of the addressing field 1505. In this illustration, an optional ModR/M byte 1602 and an optional Scale, Index, Base (SIB) byte 1604 are shown. The ModR/M byte 1602 and the SIB byte 1604 are used to encode up to two operands of an instruction, each of which is a direct register or effective memory address. Note that each of these fields are optional in that not all instructions include one or more of these fields. The MOD R/M byte 1602 includes a MOD field 1642, a register field 1644, and R/M field 1646.

The content of the MOD field 1642 distinguishes between memory access and non-memory access modes. In some embodiments, when the MOD field 1642 has a value of b11, a register-direct addressing mode is utilized, and otherwise register-indirect addressing is used.

The register field 1644 may encode either the destination register operand or a source register operand, or may encode an opcode extension and not be used to encode any instruction operand. The content of register index field 1644, directly or through address generation, specifies the locations of a source or destination operand (either in a register or in memory). In some embodiments, the register field 1644 is supplemented with an additional bit from a prefix (e.g., prefix 1501) to allow for greater addressing.

The R/M field 1646 may be used to encode an instruction operand that references a memory address, or may be used to encode either the destination register operand or a source register operand. Note the R/M field 1646 may be combined with the MOD field 1642 to dictate an addressing mode in some embodiments.

The SIB byte 1604 includes a scale field 1652, an index field 1654, and a base field 1656 to be used in the generation of an address. The scale field 1652 indicates scaling factor. The index field 1654 specifies an index register to use. In some embodiments, the index field 1654 is supplemented with an additional bit from a prefix (e.g., prefix 1501) to allow for greater addressing. The base field 1656 specifies a base register to use. In some embodiments, the base field 1656 is supplemented with an additional bit from a prefix (e.g., prefix 1501) to allow for greater addressing. In practice, the content of the scale field 1652 allows for the scaling of the content of the index field 1654 for memory address generation (e.g., for address generation that uses $2^{scale}*$index+base).

Some addressing forms utilize a displacement value to generate a memory address. For example, a memory address may be generated according to $2^{scale}*$index+base+displacement, index*scale+displacement, r/m+displacement, instruction pointer (RIP/EIP)+displacement, register+displacement, etc. The displacement may be a 1-byte, 2-byte, 4-byte, etc. value. In some embodiments, a displacement field 1507 provides this value. Additionally, in some embodiments, a displacement factor usage is encoded in the MOD field of the addressing field 1505 that indicates a compressed displacement scheme for which a displacement value is calculated by multiplying disp8 in conjunction with a scaling factor N that is determined based on the vector length, the value of a b bit, and the input element size of the instruction. The displacement value is stored in the displacement field 1507.

In some embodiments, an immediate field 1509 specifies an immediate for the instruction. An immediate may be encoded as a 1-byte value, a 2-byte value, a 4-byte value, etc.

FIG. 17 illustrates embodiments of a first prefix 1501(A). In some embodiments, the first prefix 1501(A) is an embodiment of a REX prefix. Instructions that use this prefix may specify general purpose registers, 64-bit packed data registers (e.g., single instruction, multiple data (SIMD) registers or vector registers), and/or control registers and debug registers (e.g., CR8-CR15 and DR8-DR15).

Instructions using the first prefix 1501(A) may specify up to three registers using 3-bit fields depending on the format: 1) using the reg field 1644 and the R/M field 1646 of the Mod R/M byte 1602; 2) using the Mod R/M byte 1602 with the SIB byte 1604 including using the reg field 1644 and the base field 1656 and index field 1654; or 3) using the register field of an opcode.

In the first prefix 1501(A), bit positions 7:4 are set as 0100. Bit position 3 (W) can be used to determine the operand size, but may not solely determine operand width. As such, when W=0, the operand size is determined by a code segment descriptor (CS.D) and when W=1, the operand size is 64-bit.

Note that the addition of another bit allows for 16 ($2^4$) registers to be addressed, whereas the MOD R/M reg field 1644 and MOD R/M R/M field 1646 alone can each only address 8 registers.

In the first prefix 1501(A), bit position 2 (R) may an extension of the MOD R/M reg field 1644 and may be used to modify the ModR/M reg field 1644 when that field encodes a general purpose register, a 64-bit packed data register (e.g., a SSE register), or a control or debug register. R is ignored when Mod R/M byte 1602 specifies other registers or defines an extended opcode.

Bit position 1 (X) X bit may modify the SIB byte index field 1654.

Bit position B (B) B may modify the base in the Mod R/M R/M field 1646 or the SIB byte base field 1656; or it may modify the opcode register field used for accessing general purpose registers (e.g., general purpose registers 1425).

FIGS. 18(A)-(D) illustrate embodiments of how the R, X, and B fields of the first prefix 1501(A) are used. FIG. 18(A) illustrates R and B from the first prefix 1501(A) being used to extend the reg field 1644 and R/M field 1646 of the MOD R/M byte 1602 when the SIB byte 16 04 is not used for memory addressing. FIG. 18(B) illustrates R and B from the first prefix 1501(A) being used to extend the reg field 1644 and R/M field 1646 of the MOD R/M byte 1602 when the SIB byte 1604 is not used (register-register addressing). FIG. 18(C) illustrates R, X, and B from the first prefix 1501(A) being used to extend the reg field 1644 of the MOD R/M byte 1602 and the index field 1654 and base field 1656 when the SIB byte 1604 being used for memory addressing. FIG. 18(D) illustrates B from the first prefix 1501(A) being used to extend the reg field 1644 of the MOD R/M byte 1602 when a register is encoded in the opcode 1503.

Figure 19A:
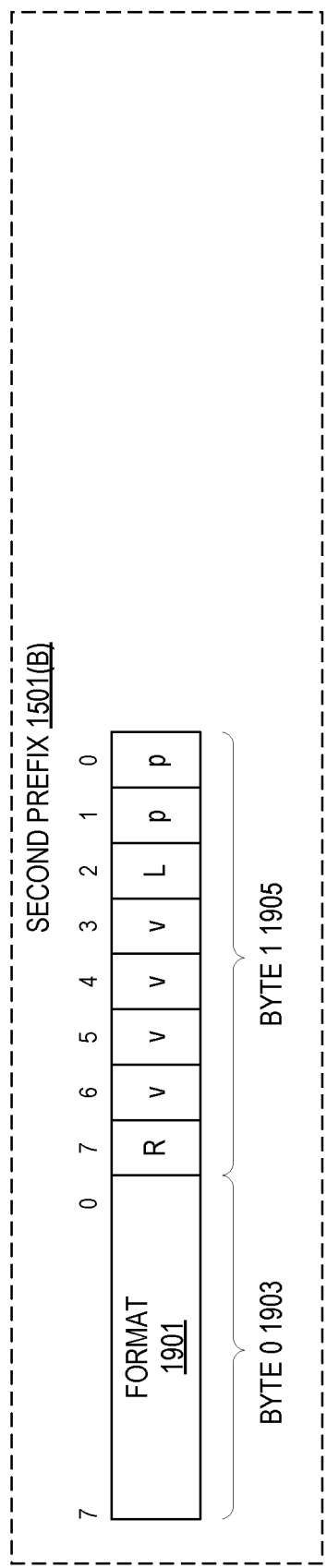
FIGS. 19(A)-(B) illustrate embodiments of a second prefix.
Figure 19B:
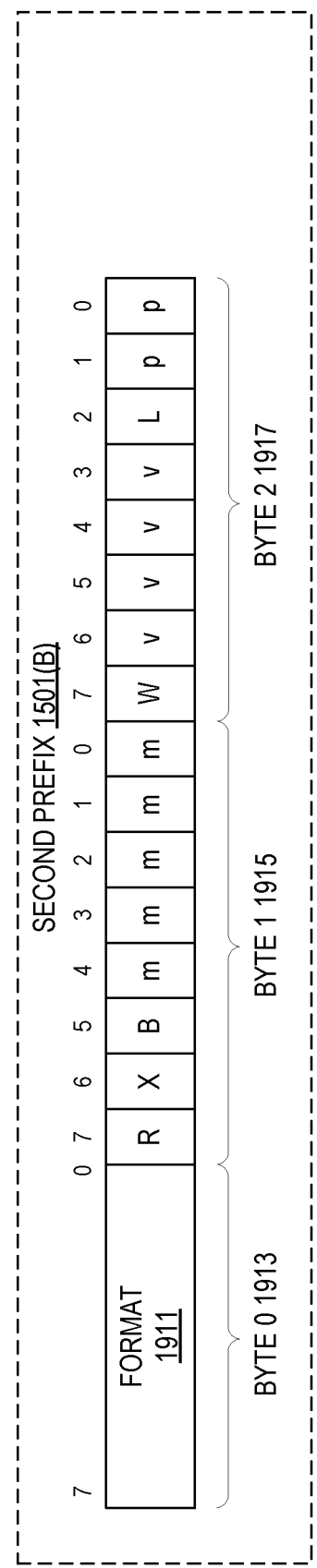

FIGS. 19(A)-(B) illustrate embodiments of a second prefix 1501(B). In some embodiments, the second prefix 1501(B) is an embodiment of a VEX prefix. The second prefix 1501(B) encoding allows instructions to have more than two operands, and allows SIMD vector registers (e.g., vector/SIMD registers 1410) to be longer than 64-bits (e.g., 128-bit and 256-bit). The use of the second prefix 1501(B) provides for three-operand (or more) syntax. For example, previous two-operand instructions performed operations such as A=A+B, which overwrites a source operand. The use of the second prefix 1501(B) enables operands to perform nondestructive operations such as A=B+C.

In some embodiments, the second prefix 1501(B) comes in two forms—a two-byte form and a three-byte form. The two-byte second prefix 1501(B) is used mainly for 128-bit, scalar, and some 256-bit instructions; while the three-byte second prefix 1501(B) provides a compact replacement of the first prefix 1501(A) and 3-byte opcode instructions.

FIG. 19(A) illustrates embodiments of a two-byte form of the second prefix 1501(B). In one example, a format field 1901 (byte 0 1903) contains the value C5H. In one example, byte 1 1905 includes a "R" value in bit[7]. This value is the complement of the same value of the first prefix 1501(A). Bit[2] is used to dictate the length (L) of the vector (where a value of 0 is a scalar or 128-bit vector and a value of 1 is a 256-bit vector). Bits[1:0] provide opcode extensionality equivalent to some legacy prefixes (e.g., 00=no prefix, 01=66H, 10=F3H, and 11=F2H). Bits[6:3] shown as vvvv may be used to: 1) encode the first source register operand, specified in inverted (1s complement) form and valid for instructions with 2 or more source operands; 2) encode the destination register operand, specified in 1s complement form for certain vector shifts; or 3) not encode any operand, the field is reserved and should contain a certain value, such as 1111b.

Instructions that use this prefix may use the Mod R/M R/M field 1646 to encode the instruction operand that references a memory address or encode either the destination register operand or a source register operand.

Instructions that use this prefix may use the Mod R/M reg field 1644 to encode either the destination register operand or a source register operand, be treated as an opcode extension and not used to encode any instruction operand.

For instruction syntax that support four operands, vvvv, the Mod R/M R/M field 1646 and the Mod R/M reg field 1644 encode three of the four operands. Bits[7:4] of the immediate 1509 are then used to encode the third source register operand.

FIG. 19(B) illustrates embodiments of a three-byte form of the second prefix 1501(B). in one example, a format field 1911 (byte 0 1913) contains the value C4H. Byte 1 1915 includes in bits[7:5] "R," "X," and "B" which are the complements of the same values of the first prefix 1501(A). Bits[4:0] of byte 1 1915 (shown as mmmmm) include content to encode, as need, one or more implied leading opcode bytes. For example, 00001 implies a 0FH leading opcode, 00010 implies a 0F38H leading opcode, 00011 implies a leading 0F3AH opcode, etc.

Bit[7] of byte 2 1917 is used similar to W of the first prefix 1501(A) including helping to determine promotable operand sizes. Bit[2] is used to dictate the length (L) of the vector (where a value of 0 is a scalar or 128-bit vector and a value of 1 is a 256-bit vector). Bits[1:0] provide opcode extensionality equivalent to some legacy prefixes (e.g., 00=no prefix, 01=66H, 10=F3H, and 11=F2H). Bits[6:3], shown as vvvv, may be used to: 1) encode the first source register operand, specified in inverted (1s complement) form and valid for instructions with 2 or more source operands; 2) encode the destination register operand, specified in 1s complement form for certain vector shifts; or 3) not encode any operand, the field is reserved and should contain a certain value, such as 1111b.

Instructions that use this prefix may use the Mod R/M R/M field 1646 to encode the instruction operand that references a memory address or encode either the destination register operand or a source register operand.

Instructions that use this prefix may use the Mod R/M reg field 1644 to encode either the destination register operand or a source register operand, be treated as an opcode extension and not used to encode any instruction operand.

For instruction syntax that support four operands, vvvv, the Mod R/M R/M field 1646, and the Mod R/M reg field 1644 encode three of the four operands. Bits[7:4] of the immediate 1509 are then used to encode the third source register operand.

Figure 20:
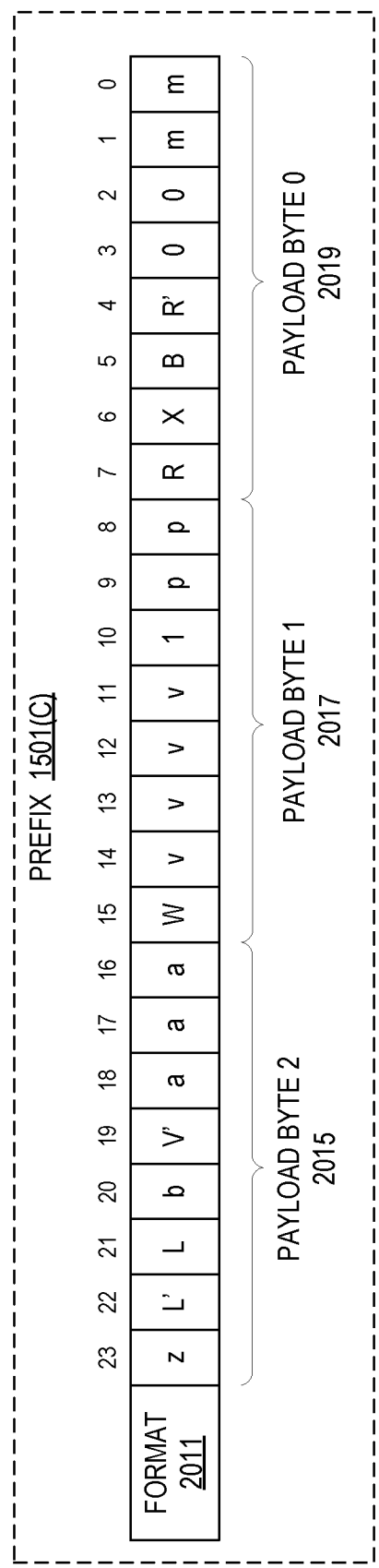
FIG. 20 illustrates embodiments of a third prefix.

FIG. 20 illustrates embodiments of a third prefix 1501(C). In some embodiments, the first prefix 1501(A) is an embodiment of an EVEX prefix. The third prefix 1501(C) is a four-byte prefix.

The third prefix 1501(C) can encode 32 vector registers (e.g., 128-bit, 256-bit, and 512-bit registers) in 64-bit mode. In some embodiments, instructions that utilize a writemask/opmask (see discussion of registers in a previous figure, such as FIG. 14) or predication utilize this prefix. Opmask register allow for conditional processing or selection control. Opmask instructions, whose source/destination operands are opmask registers and treat the content of an opmask register as a single value, are encoded using the second prefix 1501(B).

The third prefix 1501(C) may encode functionality that is specific to instruction classes (e.g., a packed instruction with "load+op" semantic can support embedded broadcast functionality, a floating-point instruction with rounding semantic can support static rounding functionality, a floating-point instruction with non-rounding arithmetic semantic can support "suppress all exceptions" functionality, etc.).

The first byte of the third prefix 1501(C) is a format field 2011 that has a value, in one example, of 62H. Subsequent bytes are referred to as payload bytes 2015-2019 and collectively form a 24-bit value of P[23:0] providing specific capability in the form of one or more fields (detailed herein).

In some embodiments, P[1:0] of payload byte 2019 are identical to the low two mmmmm bits. P[3:2] are reserved in some embodiments. Bit P[4] (R') allows access to the high 16 vector register set when combined with P[7] and the ModR/M reg field 1644. P[6] can also provide access to a high 16 vector register when SIB-type addressing is not needed. P[7:5] consist of an R, X, and B which are operand specifier modifier bits for vector register, general purpose register, memory addressing and allow access to the next set of 8 registers beyond the low 8 registers when combined with the ModR/M register field 1644 and ModR/M R/M field 1646. P[9:8] provide opcode extensionality equivalent to some legacy prefixes (e.g., 00=no prefix, 01=66H, 10=F3H, and 11=F2H). P[10] in some embodiments is a fixed value of 1. P[14:11], shown as vvvv, may be used to: 1) encode the first source register operand, specified in inverted (1s complement) form and valid for instructions with 2 or more source operands; 2) encode the destination register operand, specified in 1s complement form for certain vector shifts; or 3) not encode any operand, the field is reserved and should contain a certain value, such as 1111b.

P[15] is similar to W of the first prefix 1501(A) and second prefix 1511(B) and may serve as an opcode extension bit or operand size promotion.

P[18:16] specify the index of a register in the opmask (writemask) registers (e.g., writemask/predicate registers 1415). In one embodiment of the invention, the specific value aaa=000 has a special behavior implying no opmask is used for the particular instruction (this may be implemented in a variety of ways including the use of a opmask hardwired to all ones or hardware that bypasses the masking hardware). When merging, vector masks allow any set of elements in the destination to be protected from updates during the execution of any operation (specified by the base operation and the augmentation operation); in other one embodiment, preserving the old value of each element of the destination where the corresponding mask bit has a 0. In contrast, when zeroing vector masks allow any set of elements in the destination to be zeroed during the execution of any operation (specified by the base operation and the augmentation operation); in one embodiment, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the opmask field allows for partial vector operations, including loads, stores, arithmetic, logical, etc. While embodiments of the invention are described in which the opmask field's content selects one of a number of opmask registers that contains the opmask to be used (and thus the opmask field's content indirectly identifies that masking to be performed), alternative embodiments instead or additional allow the mask write field's content to directly specify the masking to be performed.

P[19] can be combined with P[14:11] to encode a second source vector register in a non-destructive source syntax which can access an upper 16 vector registers using P[19]. P[20] encodes multiple functionalities, which differs across different classes of instructions and can affect the meaning of the vector length/rounding control specifier field (P[22:21]). P[23] indicates support for merging-writemasking (e.g., when set to 0) or support for zeroing and merging-writemasking (e.g., when set to 1).

Exemplary embodiments of encoding of registers in instructions using the third prefix 1501(C) are detailed in the following tables.

TABLE 1

32-Register Support in 64-bit Mode

| | 4 | 3 | [2:0] | REG. TYPE | COMMON USAGES |
|---|---|---|---|---|---|
| REG | R' | R | ModR/M reg | GPR, Vector | Destination or Source |
| VVVV | V' | | vvvv | GPR, Vector | 2nd Source or Destination |
| RM | X | B | ModR/M R/M | GPR, Vector | 1st Source or Destination |
| BASE | 0 | B | ModR/M R/M | GPR | Memory addressing |
| INDEX | 0 | X | SIB.index | GPR | Memory addressing |
| VIDX | V' | X | SIB.index | Vector | VSIB memory addressing |

TABLE 2

Encoding Register Specifiers in 32-bit Mode

| | [2:0] | REG. TYPE | COMMON USAGES |
|---|---|---|---|
| REG | ModR/M reg | GPR, Vector | Destination or Source |
| VVVV | vvvv | GPR, Vector | $2^{nd}$ Source or Destination |
| RM | ModR/M R/M | GPR, Vector | $1^{st}$ Source or Destination |
| BASE | ModR/M R/M | GPR | Memory addressing |
| INDEX | SIB.index | GPR | Memory addressing |
| VIDX | SIB.index | Vector | VSIB memory addressing |

TABLE 3

Opmask Register Specifier Encoding

| | [2:0] | REG. TYPE | COMMON USAGES |
|---|---|---|---|
| REG | ModR/M Reg | k0-k7 | Source |
| VVVV | vvvv | k0-k7 | $2^{nd}$ Source |
| RM | ModR/M R/M | k0-7 | $1^{st}$ Source |
| {k1} | aaa | $k0^1$-k7 | Opmask |

Program code may be applied to input instructions to perform the functions described herein and generate output information. The output information may be applied to one or more output devices, in known fashion. For purposes of this application, a processing system includes any system that has a processor, such as, for example, a digital signal processor (DSP), a microcontroller, an application specific integrated circuit (ASIC), or a microprocessor.

The program code may be implemented in a high-level procedural or object-oriented programming language to communicate with a processing system. The program code may also be implemented in assembly or machine language, if desired. In fact, the mechanisms described herein are not limited in scope to any particular programming language. In any case, the language may be a compiled or interpreted language.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 21:
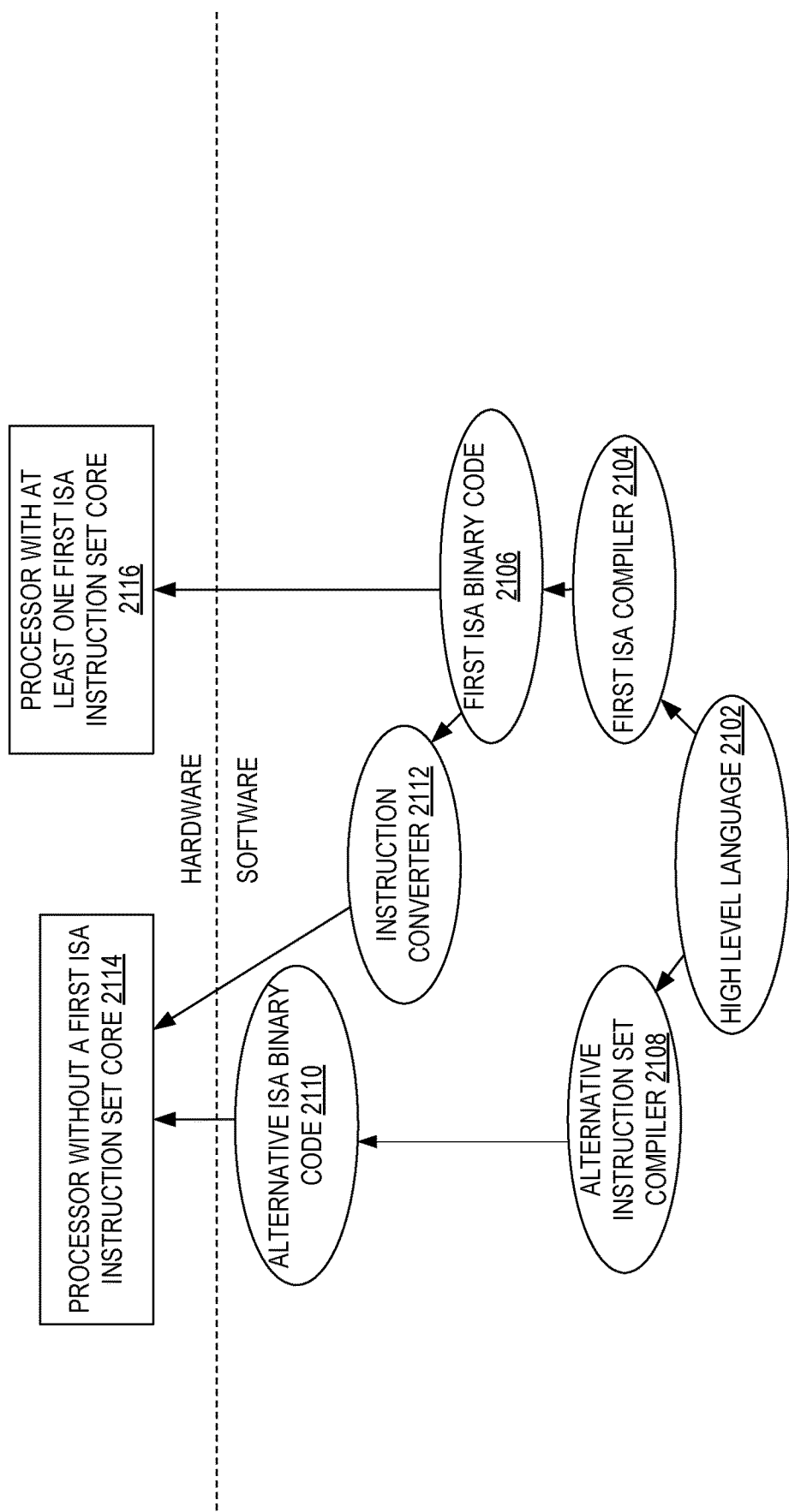
FIG. 21 illustrates a block diagram contrasting the use of a software instruction converter to convert binary instructions in a source instruction set to binary instructions in a target instruction set according to embodiments.

FIG. 21 illustrates a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 21 shows a program in a high level language 2102 may be compiled using a first ISA compiler 2104 to generate first ISA binary code 2106 that may be natively executed by a processor with at least one first instruction set core 2116. The processor with at least one first ISA instruction set core 2116 represents any processor that can perform substantially the same functions as an Intel® processor with at least one first ISA instruction set core by compatibly executing or otherwise processing (1) a substantial portion of the instruction set of the first ISA instruction set core or (2) object code versions of applications or other software targeted to run on an Intel processor with at least one first ISA instruction set core, in order to achieve substantially the same result as a processor with at least one first ISA instruction set core. The first ISA compiler 2104 represents a compiler that is operable to generate first ISA binary code 2106 (e.g., object code) that can, with or without additional linkage processing, be executed on the processor with at least one first ISA instruction set core 2116. Similarly, FIG. 21 shows the program in the high level language 2102 may be compiled using an alternative instruction set compiler 2108 to generate alternative instruction set binary code 2110 that may be natively executed by a processor without a first ISA instruction set core 2114. The instruction converter 2112 is used to convert the first ISA binary code 2106 into code that may be natively executed by the processor without a first ISA instruction set core 2114. This converted code is not likely to be the same as the alternative instruction set binary code 2110 because an instruction converter capable of this is difficult to make; however, the converted code will accomplish the general operation and be made up of instructions from the alternative instruction set. Thus, the instruction converter 2112 represents software, firmware, hardware, or a combination thereof that, through emulation, simulation or any other process, allows a processor or other electronic device that does not have a first ISA instruction set processor or core to execute the first ISA binary code 2106.

Exemplary embodiments include, but are not limited to:
1. A processor comprising:
   a processor core; and
   a memory controller coupled to the processor core, the memory controller comprising a cryptographic engine to:
     detect, within a write request for a datacache line, a key identifier (ID);
     determine that the key ID is a trust domain key ID of a plurality of key IDs;
     responsive to a determination that the key ID is the trust domain key ID, set an ownership bit (TD-bit) of the cache line to indicate the cache line belongs to a trust domain;
     determine that a TD-bit cacheline is not in a metadata cache, wherein a TD-bit cacheline comprises a plurality of TD-bits;

fetch the TD-bit cacheline from memory along with an associated MAC;

cache the fetched TD-bit cacheline;

attempt to verify the MAC associated with the TD-bit cacheline;

update the TD-bit cacheline in the metadata cache when the MAC associated with the TD-bit cacheline is verified;

encrypt the data cacheline to generate encrypted data;

write the encrypted data cacheline to the memory.

2. The processor of claim 1, wherein the fetched MAC is to be stored in sequestered memory.

3. The processor of claim 1, wherein to verify the MAC, the cryptographic engine is further to generate a MAC by applying a keyed hash algorithm over a combination of at least the encrypted data, an encrypted physical address, and the ownership bit, and comparing the generated MAC with the fetched MAC.

4. The processor of claim 1, wherein the fetched MAC is to be stored in adjacent to the TD-bit cacheline.

5. The processor of claim 1, wherein the MAC associated with the TD-bit cacheline is not verified, a security exception is to be generated.

6. The processor of claim 1, wherein, in response to a read request for the cache line, the memory controller is further to:

read a data cacheline from memory;

detect, within a write request for a datacache line, a key identifier (ID);

determine and set an access type;

responsive to a determination that the key ID is the trust domain key ID, set an ownership bit (TD-bit) of the cache line to indicate the cache line belongs to a trust domain;

determine that a TD-bit cacheline is not in a metadata cache, wherein a TD-bit cacheline comprises a plurality of TD-bits;

fetch the TD-bit cacheline from memory along with an associated MAC;

cache the fetched TD-bit cacheline;

attempt to verify the MAC associated with the TD-bit cacheline;

update the TD-bit cacheline in the metadata cache when the MAC associated with the TD-bit cacheline is verified;

decrypt the data cacheline to generate encrypted data;

return the decrypted data cacheline to the memory

7. The processor of claim 6, wherein the memory controller is further to:

determine a verified TD-bit has a same access type as determined and set, wherein when the TD-bit and access type do not match, poisoned and zeroed data is returned.

8. The processor of claim 7, where the cryptographic engine is further to set a poison status bit in a key data structure of the cryptographic engine, the poison status bit being associated with the key ID.

9. The processor of claim 6, wherein the cryptographic engine further comprises a key data structure having entries that include a key ID and key.

10. A system comprising:

a memory device to store cache lines and associated ownership bits;

a processor core; and a memory controller coupled between the memory device and the processor core, wherein the memory controller comprises a cryptographic engine to:

detect, within a write request for a datacache line, a key identifier (ID);

determine that the key ID is a trust domain key ID of a plurality of key IDs;

responsive to a determination that the key ID is the trust domain key ID, set an ownership bit (TD-bit) of the cache line to indicate the cache line belongs to a trust domain;

determine that a TD-bit cacheline is not in a metadata cache, wherein a TD-bit cacheline comprises a plurality of TD-bits;

fetch the TD-bit cacheline from memory along with an associated MAC;

cache the fetched TD-bit cacheline;

attempt to verify the MAC associated with the TD-bit cacheline;

update the TD-bit cacheline in the metadata cache when the MAC associated with the TD-bit cacheline is verified;

encrypt the data cacheline to generate encrypted data;

write the encrypted data cacheline to the memory.

11. The system of claim 10, wherein the fetched MAC is to be stored in sequestered memory.

12. The system of claim 10, wherein to verify the MAC, the cryptographic engine is further to generate a MAC by applying a keyed hash algorithm over a combination of at least the encrypted data, an encrypted physical address, and the ownership bit, and comparing the generated MAC with the fetched MAC.

13. The system of claim 10, wherein the fetched MAC is to be stored in adjacent to the TD-bit cacheline.

14. The system of claim 10, wherein the MAC associated with the TD-bit cacheline is not verified, a security exception is to be generated.

15. The system of claim 10, wherein, in response to a read request for the cache line, the memory controller is further to:

read a data cacheline from memory;

detect, within a write request for a datacache line, a key identifier (ID);

determine and set an access type;

responsive to a determination that the key ID is the trust domain key ID, set an ownership bit (TD-bit) of the cache line to indicate the cache line belongs to a trust domain;

determine that a TD-bit cacheline is not in a metadata cache, wherein a TD-bit cacheline comprises a plurality of TD-bits;

fetch the TD-bit cacheline from memory along with an associated MAC;

cache the fetched TD-bit cacheline;

attempt to verify the MAC associated with the TD-bit cacheline;

update the TD-bit cacheline in the metadata cache when the MAC associated with the TD-bit cacheline is verified;
decrypt the data cacheline to generate encrypted data;
return the decrypted data cacheline to the memory
16. The system of claim 15, wherein the memory controller is further to:
determine a verified TD-bit has a same access type as determined and set, wherein when the TD-bit and access type do not match, poisoned and zeroed data is returned.
17. The system of claim 16, where the cryptographic engine is further to set a poison status bit in a key data structure of the cryptographic engine, the poison status bit being associated with the key ID.
18. The system of claim 10, wherein the cryptographic engine further comprises a key data structure having entries that include a key ID and key.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A processor comprising:
a processor core; and
a memory controller coupled to the processor core, the memory controller comprising a cryptographic engine to:
detect, within a write request for a datacache line, a key identifier (ID);
determine that the key ID is a trust domain key ID of a plurality of key IDs;
responsive to a determination that the key ID is the trust domain key ID, set an ownership bit (TD-bit) of the cache line to indicate the cache line belongs to a trust domain;
determine that a TD-bit cacheline is not in a metadata cache, wherein the TD-bit cacheline comprises a plurality of TD-bits;
fetch the TD-bit cacheline from memory along with an associated MAC;
cache the fetched TD-bit cacheline;
attempt to verify the MAC associated with the TD-bit cacheline;
update the TD-bit cacheline in the metadata cache when the MAC associated with the TD-bit cacheline is verified;
encrypt the data cacheline to generate encrypted data; and
write the encrypted data cacheline to the memory.
2. The processor of claim 1, wherein the fetched MAC is to be stored in sequestered memory.
3. The processor of claim 1, wherein to verify the MAC, the cryptographic engine is further to generate a MAC by applying a keyed hash algorithm over a combination of at least the encrypted data, an encrypted physical address, and the ownership bit, and comparing the generated MAC with the fetched MAC.
4. The processor of claim 1, wherein the fetched MAC is to be stored in adjacent to the TD-bit cacheline.
5. The processor of claim 1, wherein the MAC associated with the TD-bit cacheline is not verified, a security exception is to be generated.
6. The processor of claim 1, wherein, in response to a read request for the cache line, the memory controller is further to:
read a data cacheline from memory;
detect, within a write request for a datacache line, a key identifier (ID);
determine and set an access type;
responsive to a determination that the key ID is the trust domain key ID, set an ownership bit (TD-bit) of the cache line to indicate the cache line belongs to a trust domain;
determine that a TD-bit cacheline is not in a metadata cache, wherein a TD-bit cacheline comprises a plurality of TD-bits;
fetch the TD-bit cacheline from memory along with an associated MAC;
cache the fetched TD-bit cacheline;
attempt to verify the MAC associated with the TD-bit cacheline;
update the TD-bit cacheline in the metadata cache when the MAC associated with the TD-bit cacheline is verified;
decrypt the data cacheline to generate encrypted data; and
return the decrypted data cacheline to the memory.
7. The processor of claim 6, wherein the memory controller is further to:
determine a verified TD-bit has a same access type as determined and set, wherein when the TD-bit and access type do not match, poisoned and zeroed data is returned.
8. The processor of claim 7, where the cryptographic engine is further to set a poison status bit in a key data structure of the cryptographic engine, the poison status bit being associated with the key ID.
9. The processor of claim 6, wherein the cryptographic engine further comprises a key data structure having entries that include a key ID and key.
10. A system comprising:
a memory device to store cache lines and associated ownership bits;
a processor core; and
a memory controller coupled between the memory device and the processor core, wherein the memory controller comprises a cryptographic engine to:
detect, within a write request for a datacache line, a key identifier (ID);

determine that the key ID is a trust domain key ID of a plurality of key IDs;

responsive to the determination that the key ID is the trust domain key ID, set an ownership bit (TD-bit) of the cache line to indicate the datacache line belongs to a trust domain;

determine that a TD-bit cacheline is not in a metadata cache, wherein the TD-bit cacheline comprises a plurality of TD-bits;

fetch the TD-bit cacheline from memory along with an associated MAC;

cache the fetched TD-bit cacheline;

attempt to verify the MAC associated with the TD-bit cacheline;

update the TD-bit cacheline in the metadata cache when the MAC associated with the TD-bit cacheline is verified;

encrypt the data cacheline to generate encrypted data; and write the encrypted data cacheline to the memory.

11. The system of claim 10, wherein the fetched MAC is to be stored in sequestered memory.

12. The system of claim 10, wherein to verify the MAC, the cryptographic engine is further to generate a MAC by applying a keyed hash algorithm over a combination of at least the encrypted data, an encrypted physical address, and the ownership bit, and comparing the generated MAC with the fetched MAC.

13. The system of claim 10, wherein the fetched MAC is to be stored in adjacent to the TD-bit cacheline.

14. The system of claim 10, wherein the MAC associated with the TD-bit cacheline is not verified, a security exception is to be generated.

15. The system of claim 10, wherein, in response to a read request for the cache line, the memory controller is further to:

read a data cacheline from memory;

detect, within a write request for a datacache line, a key identifier (ID);

determine and set an access type;

responsive to a determination that the key ID is the trust domain key ID, set an ownership bit (TD-bit) of the cache line to indicate the cache line belongs to a trust domain;

determine that a TD-bit cacheline is not in a metadata cache, wherein a TD-bit cacheline comprises a plurality of TD-bits;

fetch the TD-bit cacheline from memory along with an associated MAC;

cache the fetched TD-bit cacheline;

attempt to verify the MAC associated with the TD-bit cacheline;

update the TD-bit cacheline in the metadata cache when the MAC associated with the TD-bit cacheline is verified;

decrypt the data cacheline to generate encrypted data; and return the decrypted data cacheline to the memory.

16. The system of claim 15, wherein the memory controller is further to:

determine a verified TD-bit has a same access type as determined and set, wherein when the TD-bit and access type do not match, poisoned and zeroed data is returned.

17. The system of claim 16, where the cryptographic engine is further to set a poison status bit in a key data structure of the cryptographic engine, the poison status bit being associated with the key ID.

18. The system of claim 10, wherein the cryptographic engine further comprises a key data structure having entries that include a key ID and key.

* * * * *